Jan. 3, 1956 R. C. CARLSON 2,729,456

PHONOGRAPH RECORD PLAYER

Filed Nov. 15, 1949 15 Sheets-Sheet 1

Inventor
Reuben C. Carlson
By:- J. D. Douglas
His Att'y.

Inventor:
Reuben C. Carlson
By: J. D. Douglas
His Att'y.

Jan. 3, 1956 | R. C. CARLSON | 2,729,456

PHONOGRAPH RECORD PLAYER

Filed Nov. 15, 1949 | 15 Sheets-Sheet 3

Inventor.
Reuben C. Carlson
By:- J. D. Douglas
His Atty.

Inventor
Reuben C. Carlson
By- J. D. Douglas
His Att'y.

PHONOGRAPH RECORD PLAYER

Filed Nov. 15, 1949

Inventor.
Reuben C. Carlson
By:- J. W. Douglas
His Att'y.

Jan. 3, 1956 R. C. CARLSON 2,729,456

PHONOGRAPH RECORD PLAYER

Filed Nov. 15, 1949 15 Sheets-Sheet 6

Inventor
Reuben C. Carlson
By:- J. W. Douglas
His Att'y

Inventor
Reuben C. Carlson
By:- J. W. Douglas
His Att'y.

Inventor
Reuben C. Carlson
By:- J. D. Douglas
His Att'y.

Inventor
Reuben C. Carlson
By:- J. D. Douglas
His Atty.

Inventor
Reuben C. Carlson
By:- J. D. Douglas
His Atty.

Inventor
Reuben C. Carlson
By: J. D. Douglas
His Att'y.

Inventor
Reuben C. Carlson
By:- J. W. Douglas
His Att'y

Inventor
Reuben C. Carlson
By:- J. N. Douglas
His Att'y.

Inventor
Reuben C. Carlson
By: J. W. Douglas
His Atty.

Inventor.
Reuben C. Carlson
By:- J. N. Douglas
His Atty.

United States Patent Office 2,729,456
Patented Jan. 3, 1956

2,729,456

PHONOGRAPH RECORD PLAYER

Reuben C. Carlson, Chicago, Ill., assignor to Admiral Corporation, Chicago, Ill., a corporation of Delaware Application November 15, 1949, Serial No. 127,465
14 Claims. (Cl. 274—10)

This invention relates to phonograph record players of the type adapted to reproduce one side of a plurality of records, differing in size, the sizes being mixed and in any order. It is particularly adapted to a type of record player which is housed within a cabinet having a slot in one of the walls thereof through which the records are adapted to be passed to the record player proper.

More specifically, the invention comprehends improvements to a record player of the foregoing description, the improvements including more simple and less expensive mechanism for transferring records from a magazine of the record player to a station where the records are to be reproduced and after they have been reproduced transferring them to a rejected record compartment in the base of the cabinet.

Other advantages of the invention will be set forth in part hereinafter and in part will be obvious herefrom, or may be learned by practice with the invention, the same being realized and attained by means of the instrumentalities and combinations pointed out in the appended claims.

The accompanying drawings, referred to herein and constituting a part hereof, illustrate one embodiment of the invention and together with the description, serve to explain the principles of the drawings.

Figure 2:
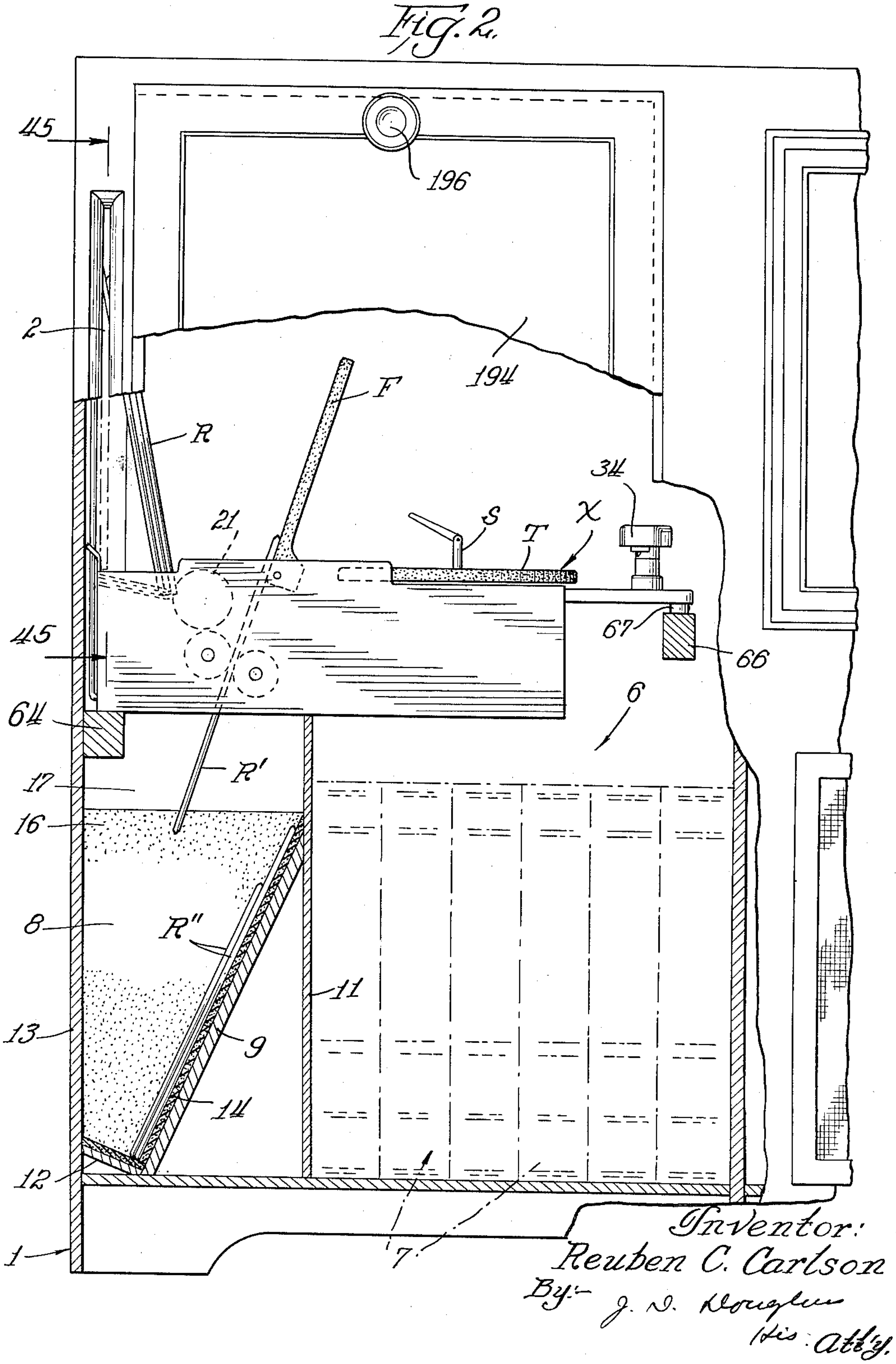
Fig. 2 is a front elevational view of the cabinet, the same being broken away to reveal the formation of the improved record player in side elevation.
Figure 5:
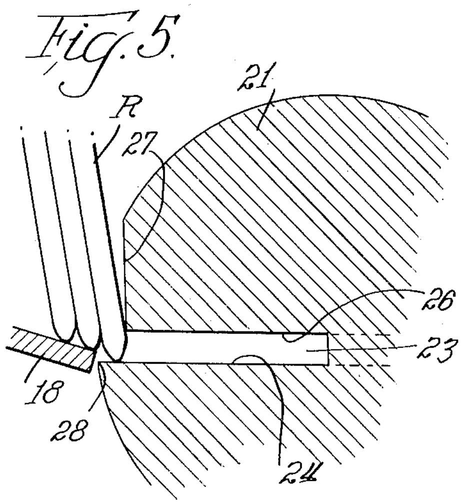
Figure 9:
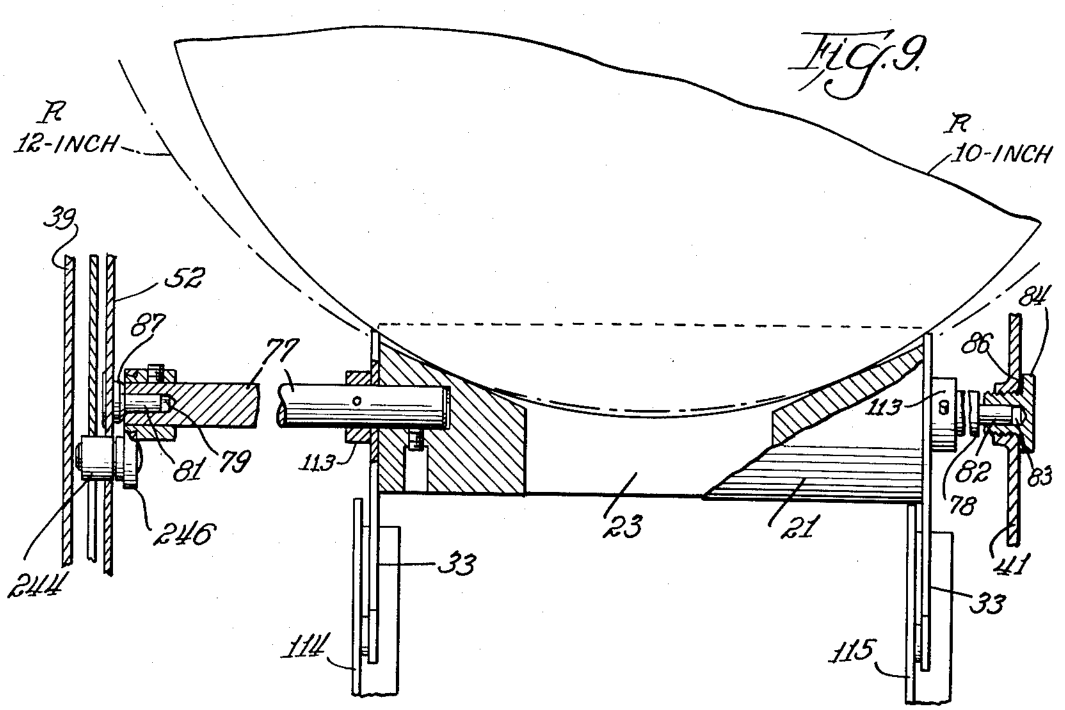
Figures 10, 41:
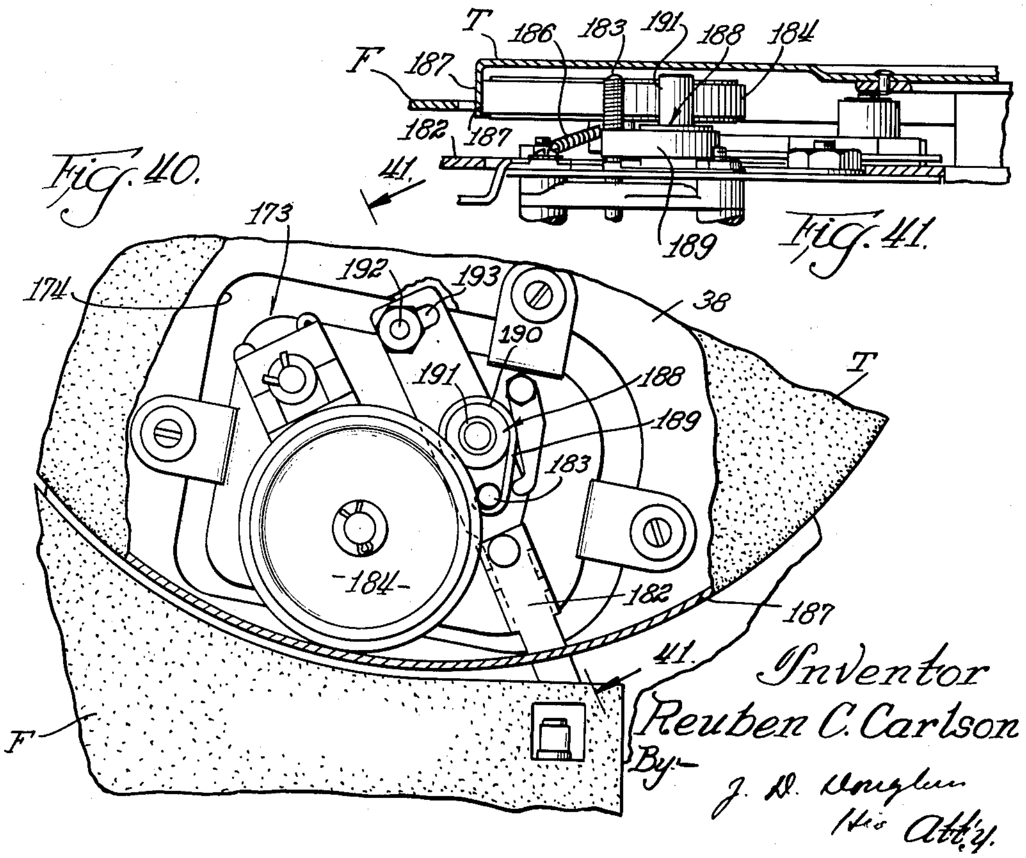
Figure 10:
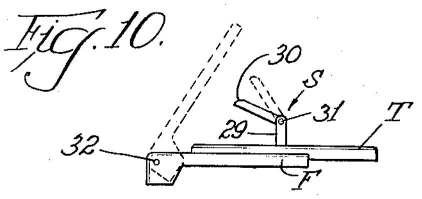
Figures 11, 15:
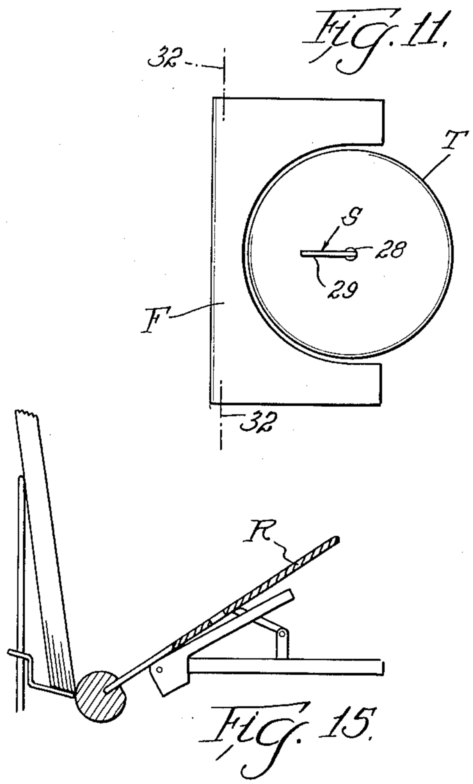
Figures 17, 37:
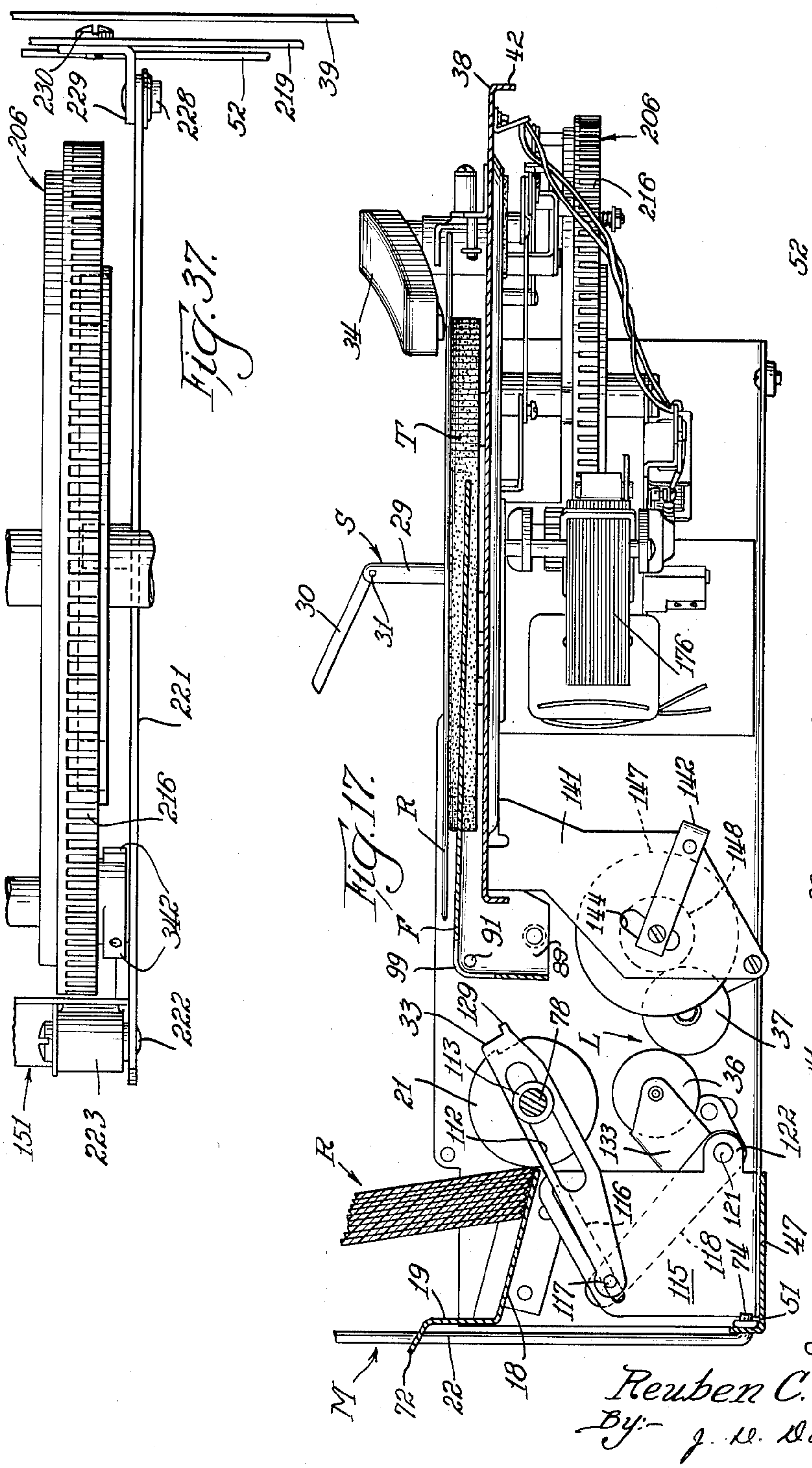
Figures 18, 32, 33:
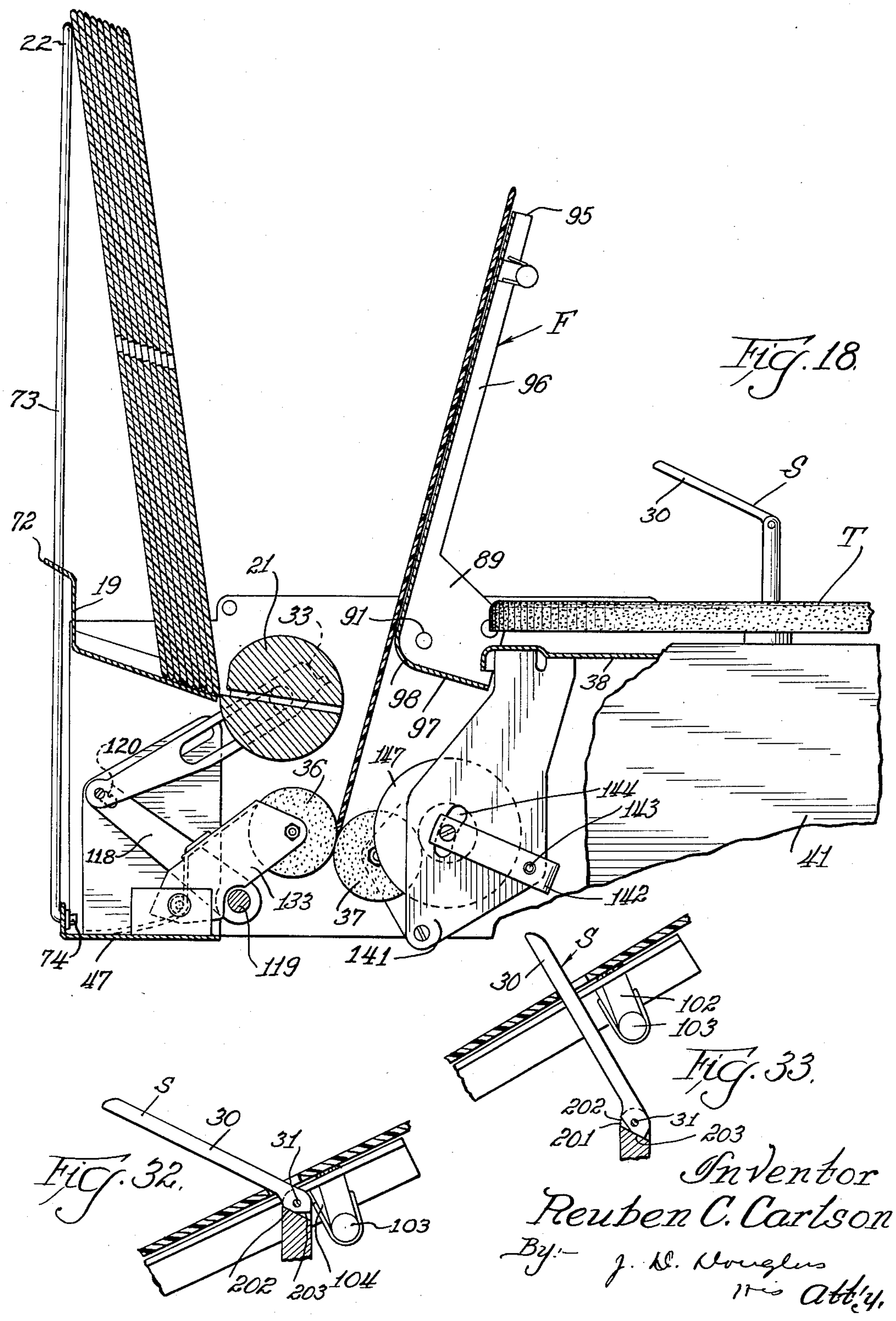

Figs. 4 to 8 inclusive are diagrammatic sectional views of the transfer cylinder showing several steps in the operation thereof;

Fig. 9 is a vertical sectional view taken diametrically of the transfer cylinder and parts cooperating therewith, in section and in elevation;

Fig. 10 is a diagrammatic view of the turntable, flap and spindle, in side elevation;

Fig. 11 is a top plan view of the parts shown in Fig. 10;

Figs. 12 to 16, inclusive, are diagrammatic side elevational views showing elements of the record player in various phases of transferring a record from the magazine to the turntable;

Fig. 17 is a fragmentary side elevational view corresponding to Fig. 2, but drawn to an enlarged scale, parts of the record player being broken away to reveal the structure of other parts and positions of same while a record is being reproduced;

Fig. 18 is another fragmentary sectional view corresponding to Fig. 5 showing elements of the record player mechanism in the positions they occupy when a record has been removed from the turntable and is in initial engagement with the record slow-down mechanism.

Figures 1, 42:
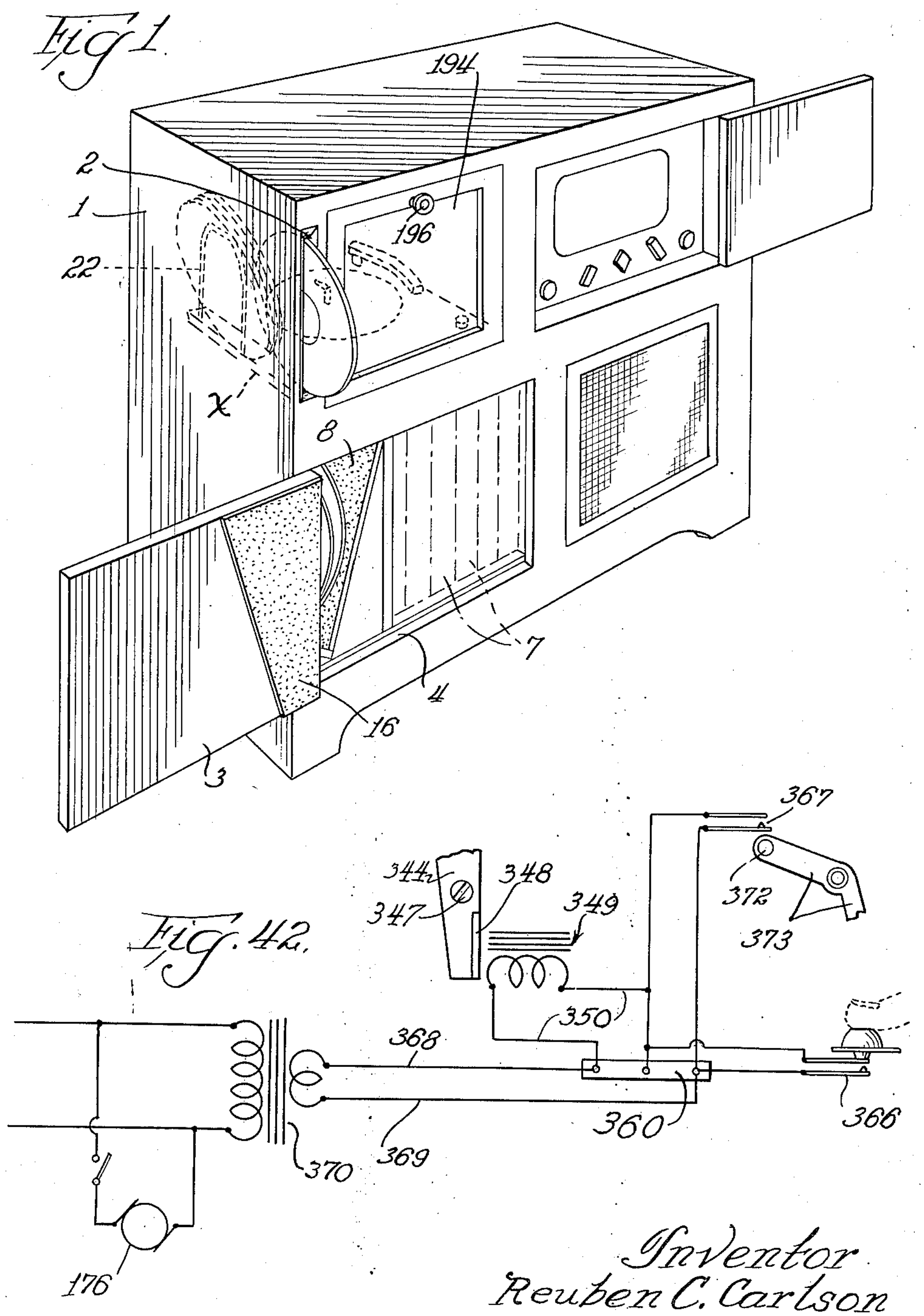
Fig. 1 is a perspective view of a cabinet in connection with which the present invention is incorporated.
Figure 6:
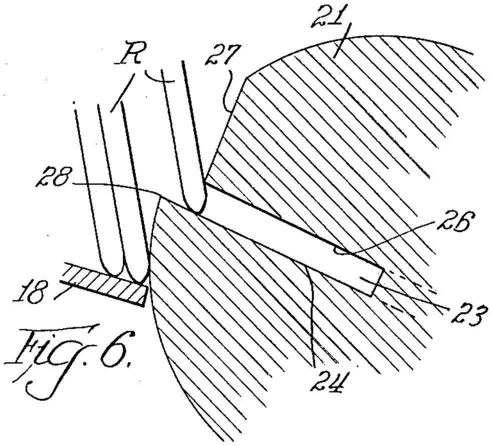
Figure 27:
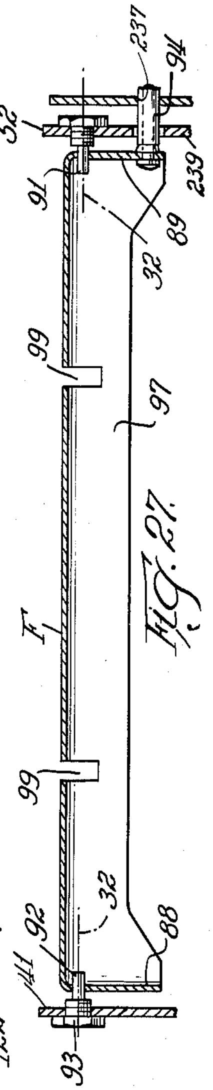
Figure 19:
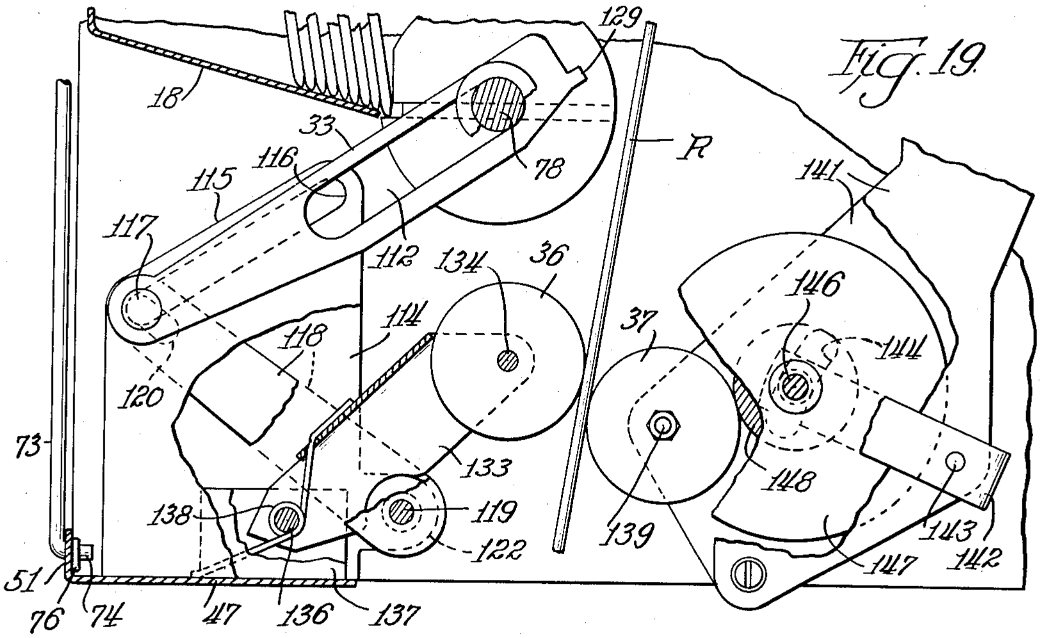
Figure 22:
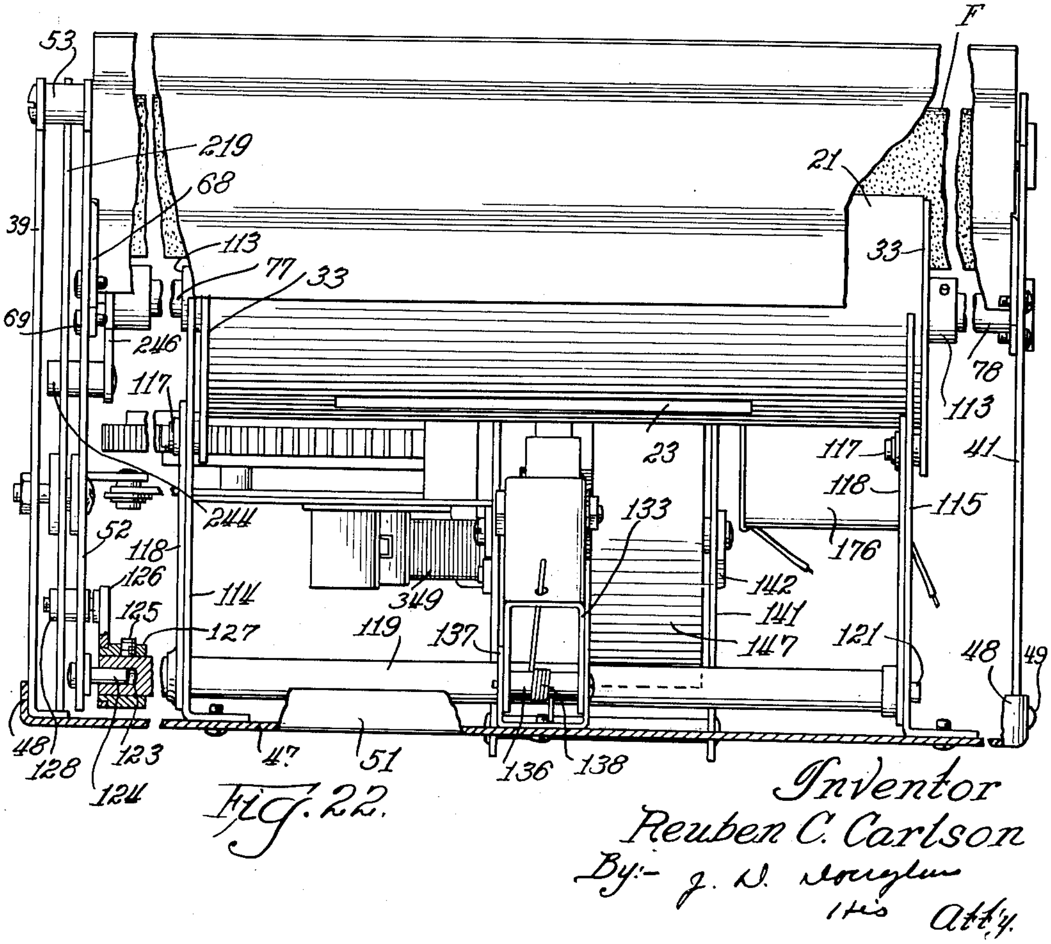
Figure 20:
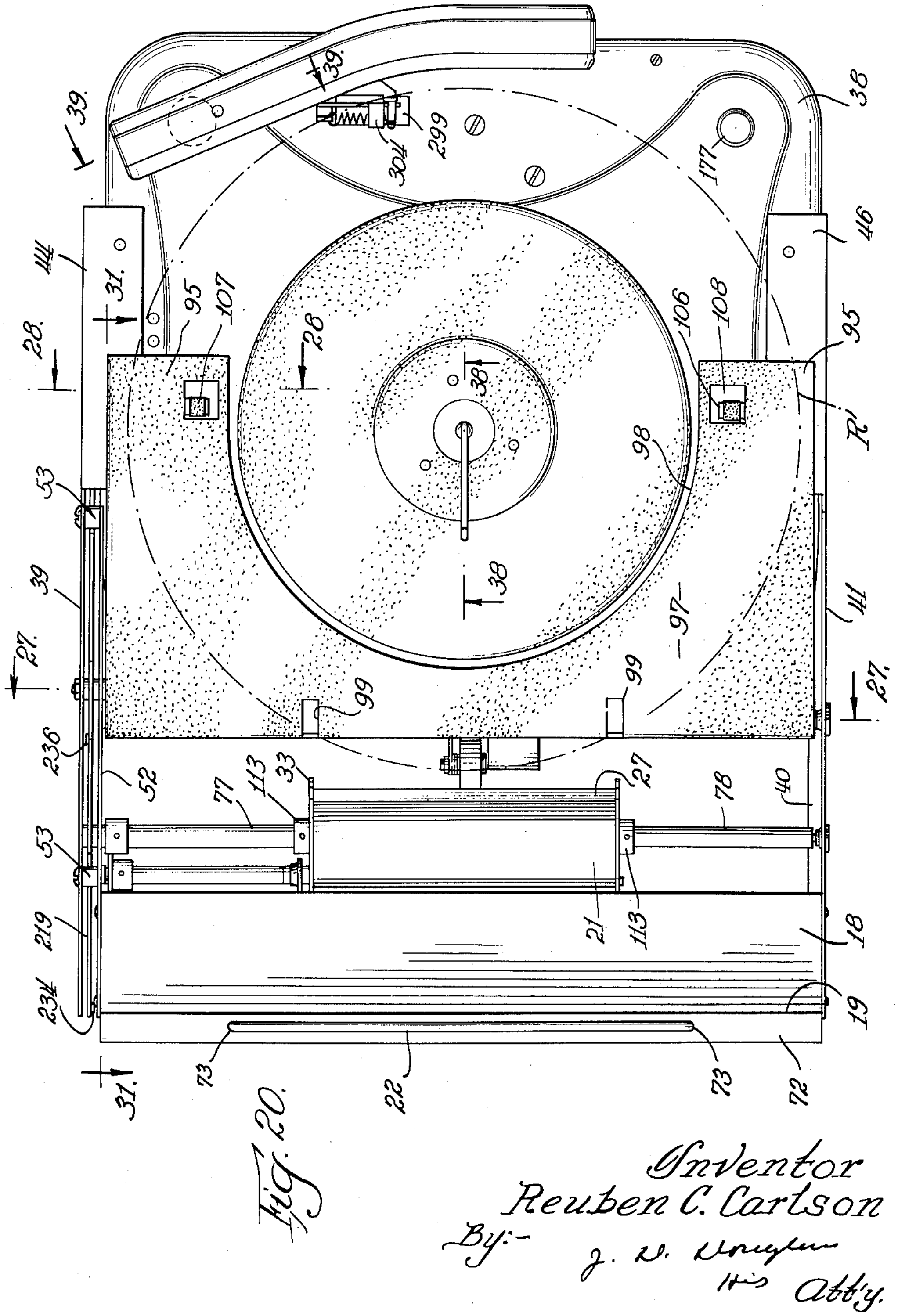
Figure 21:
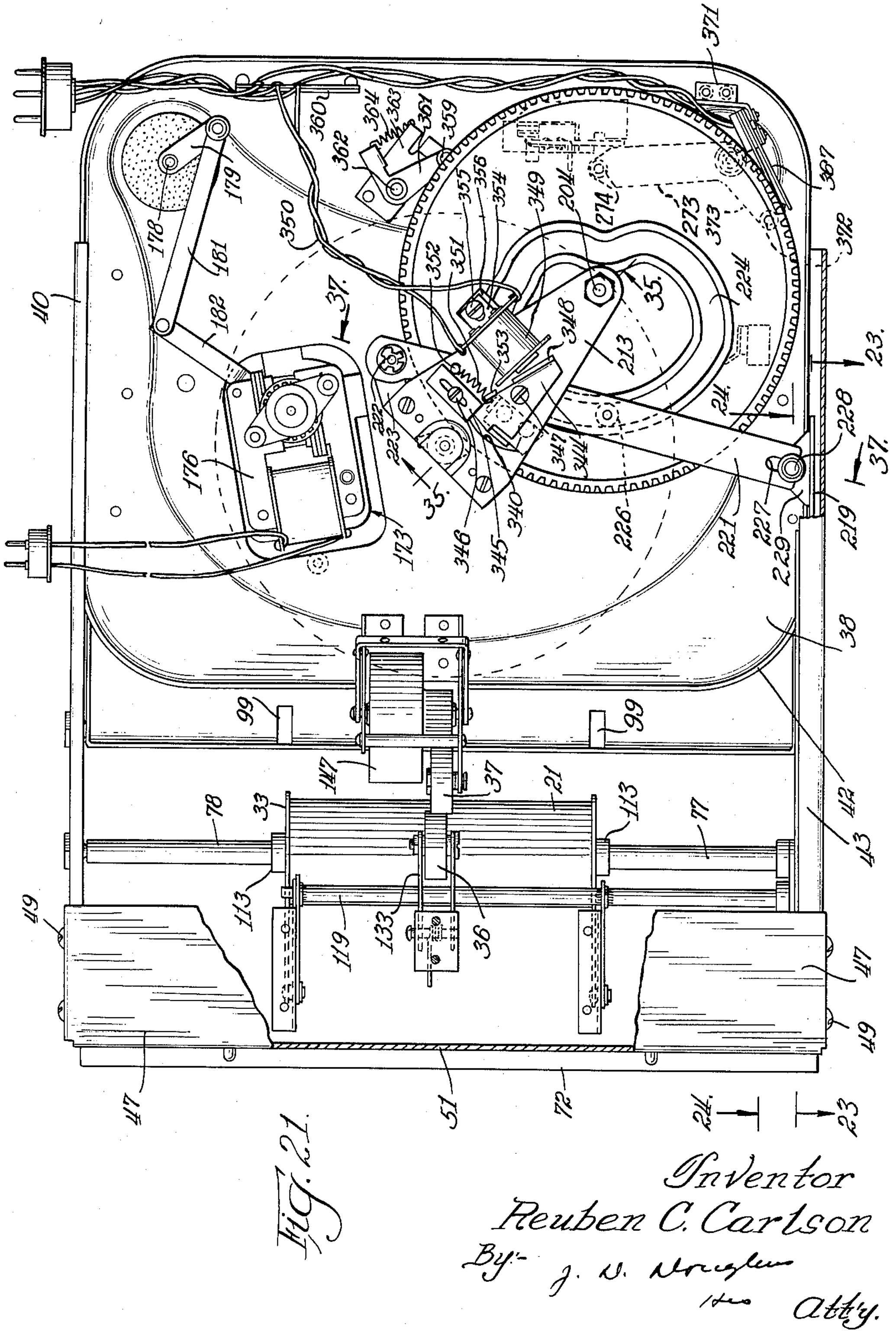
Figure 23:
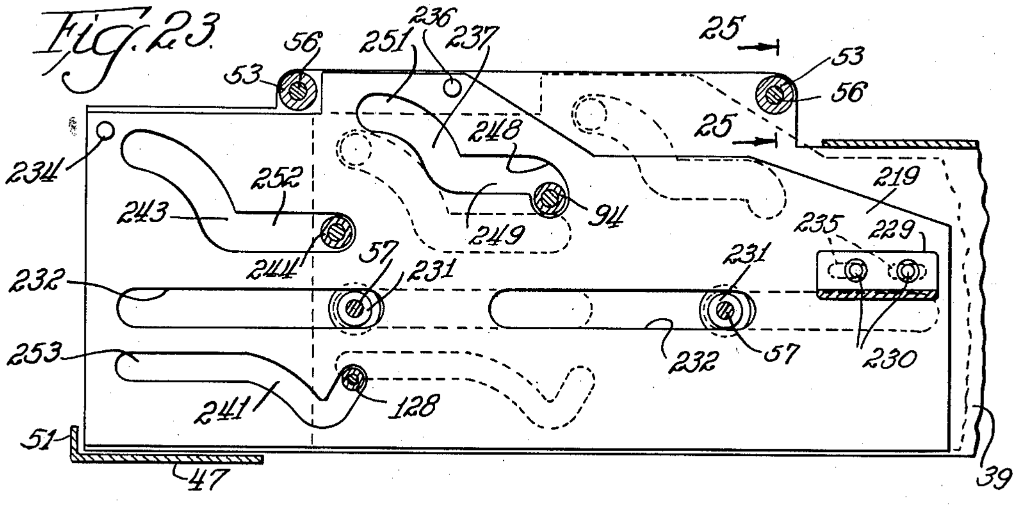
Figures 24, 25, 26, 39:
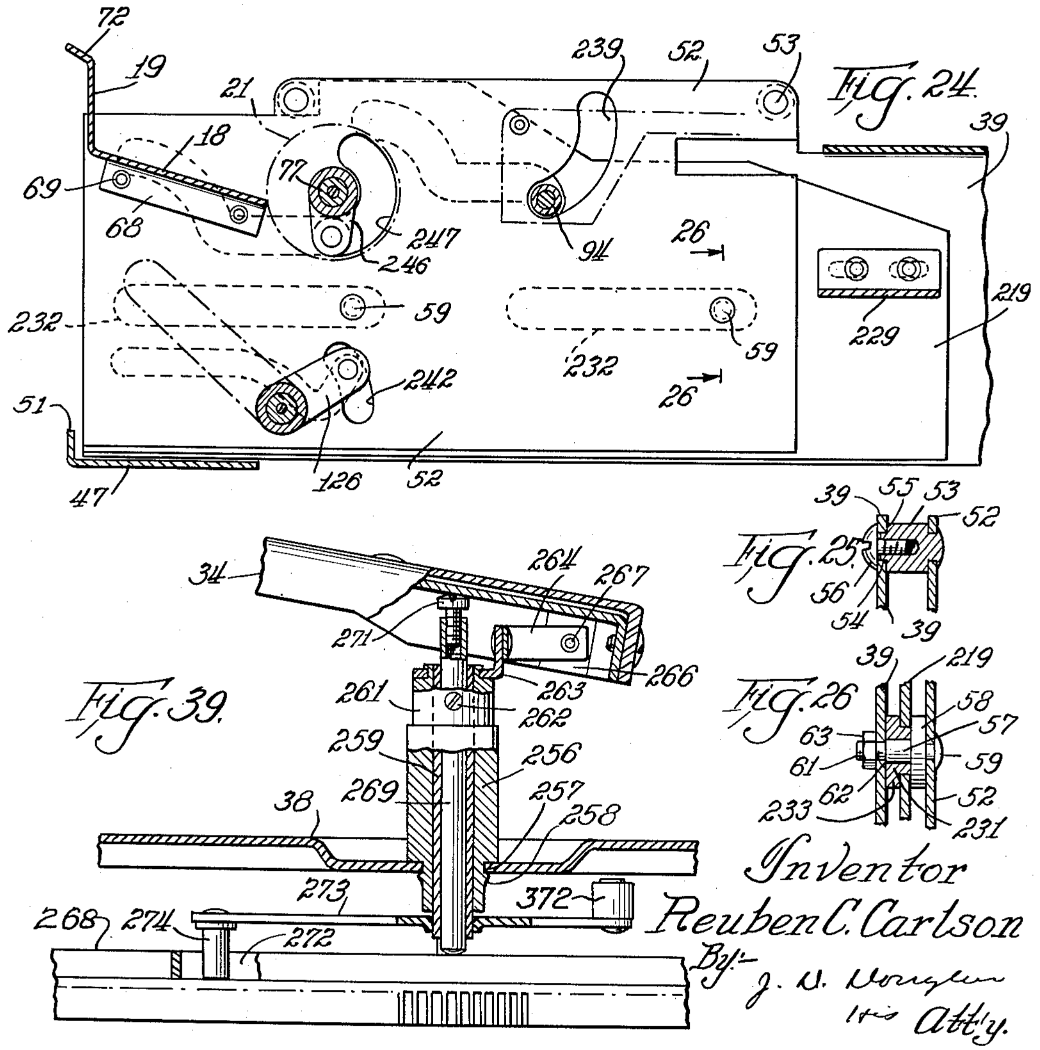
Figures 28, 29, 30, 45, 46, 47, 48:
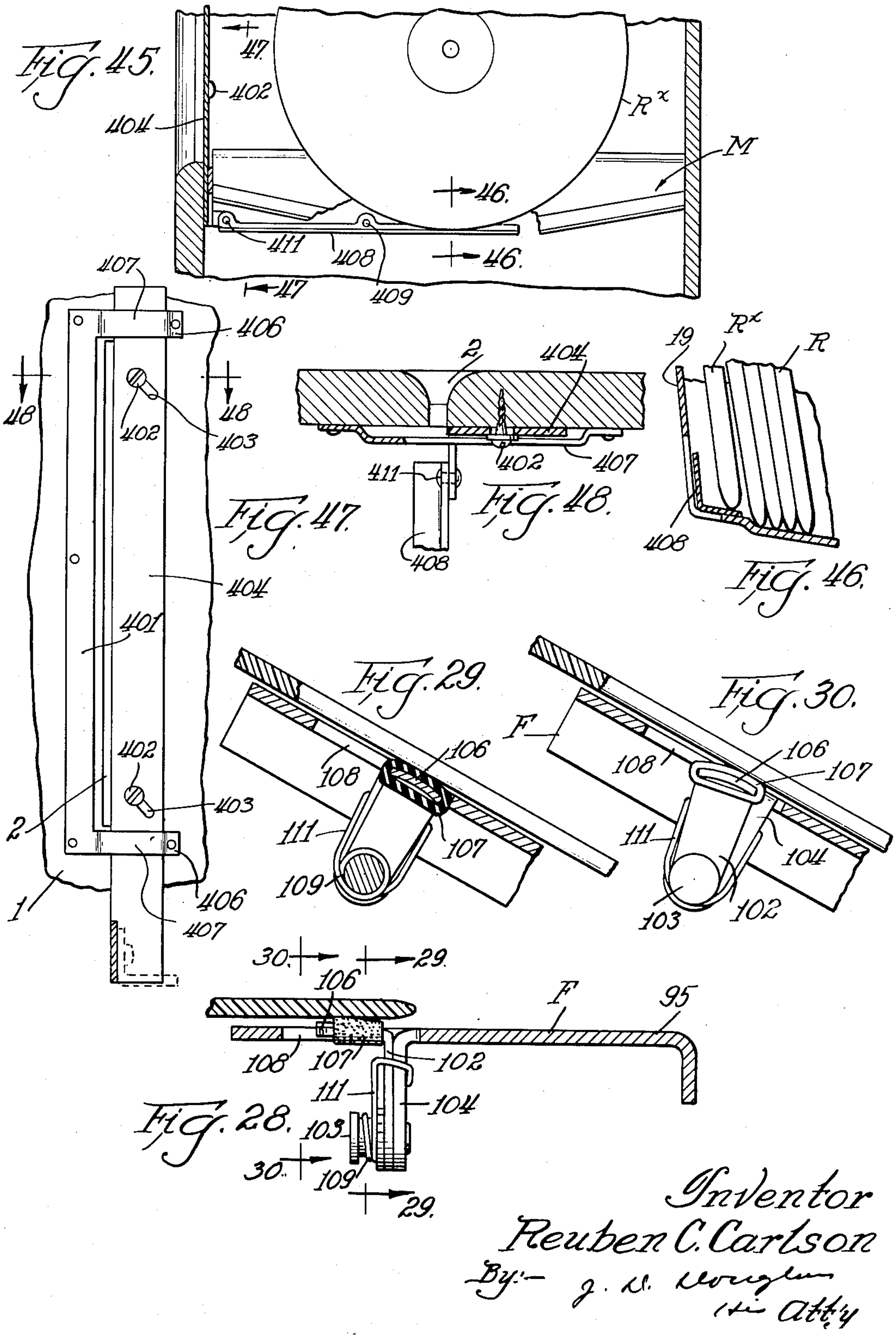
Figure 31:
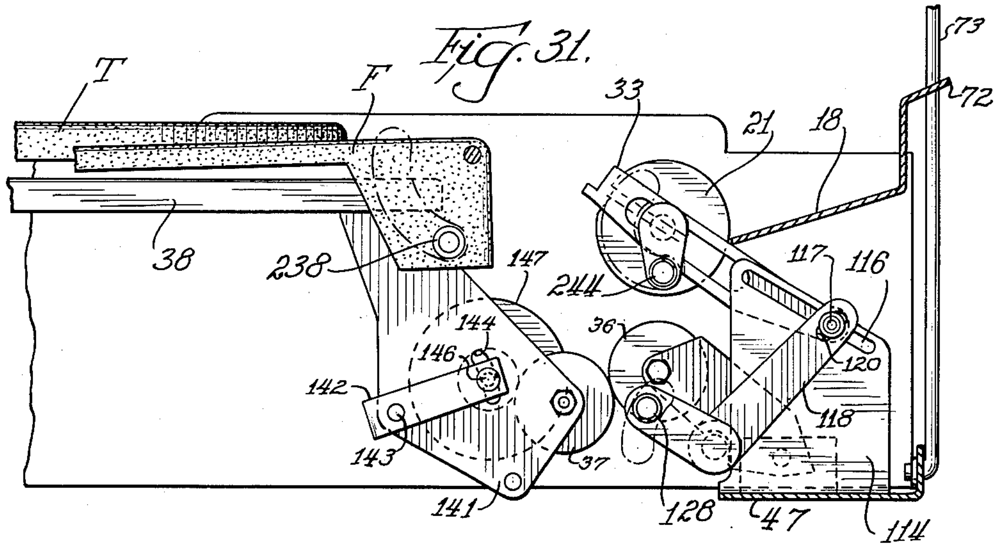
Figure 38:
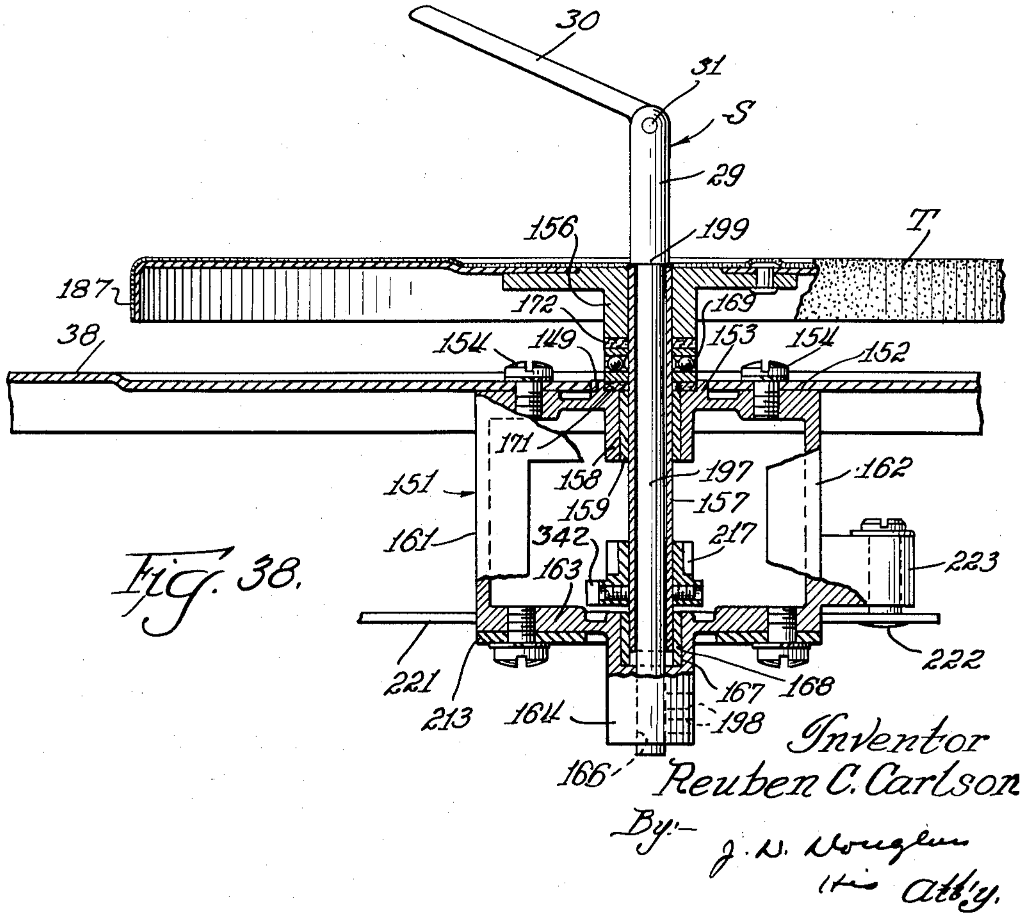
Figure 34:
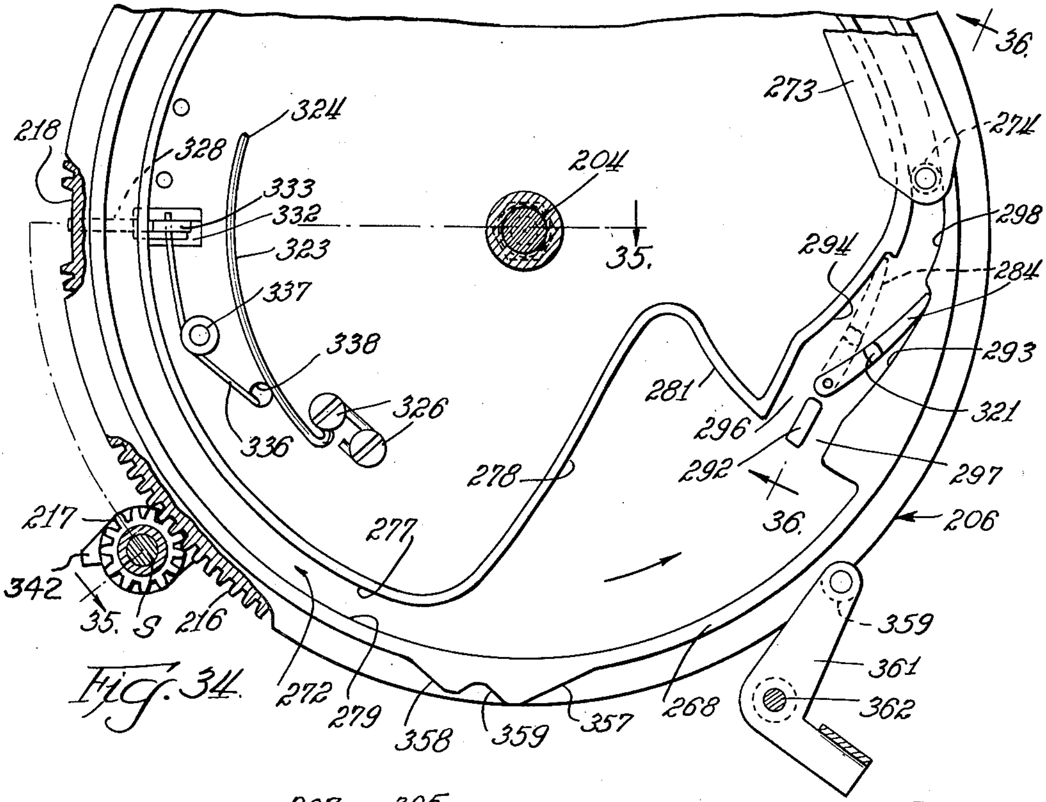
Figures 35, 36:
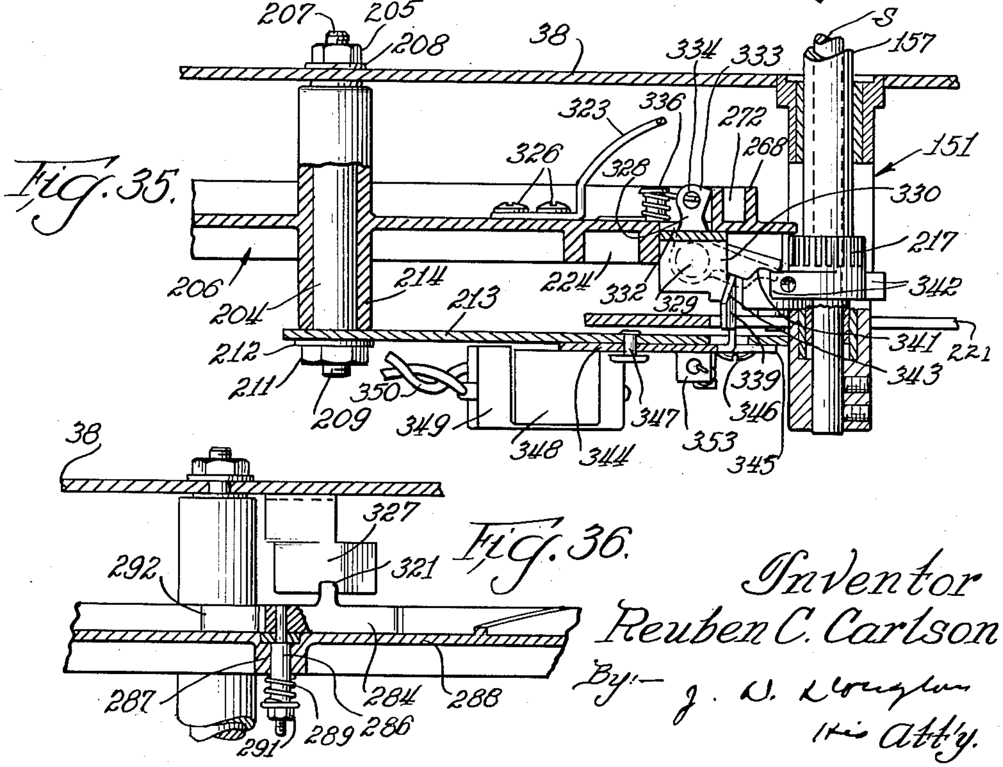
Figure 43:
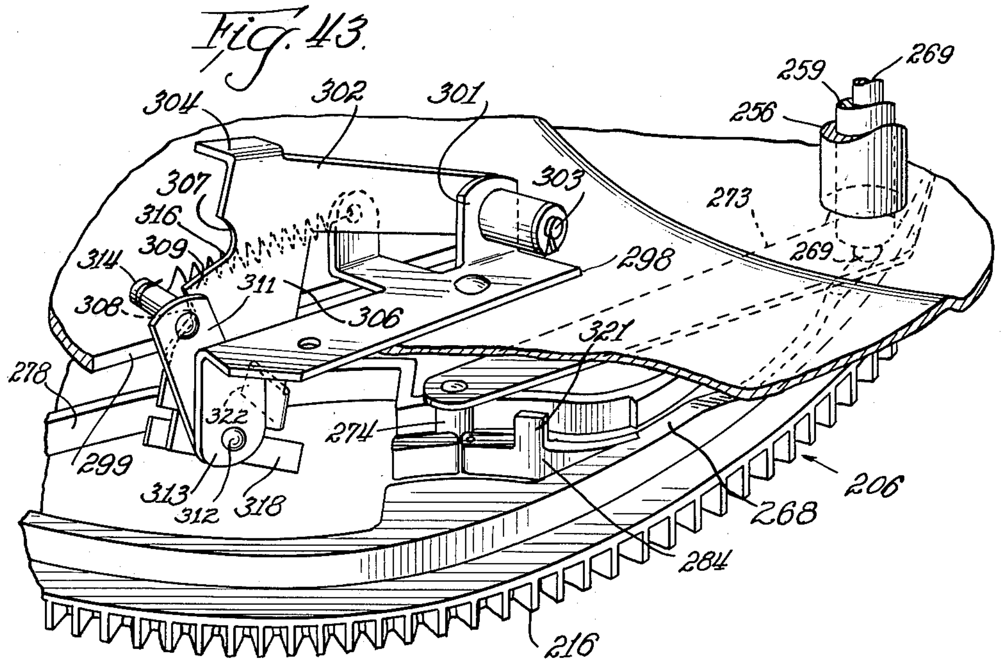
Figure 44:
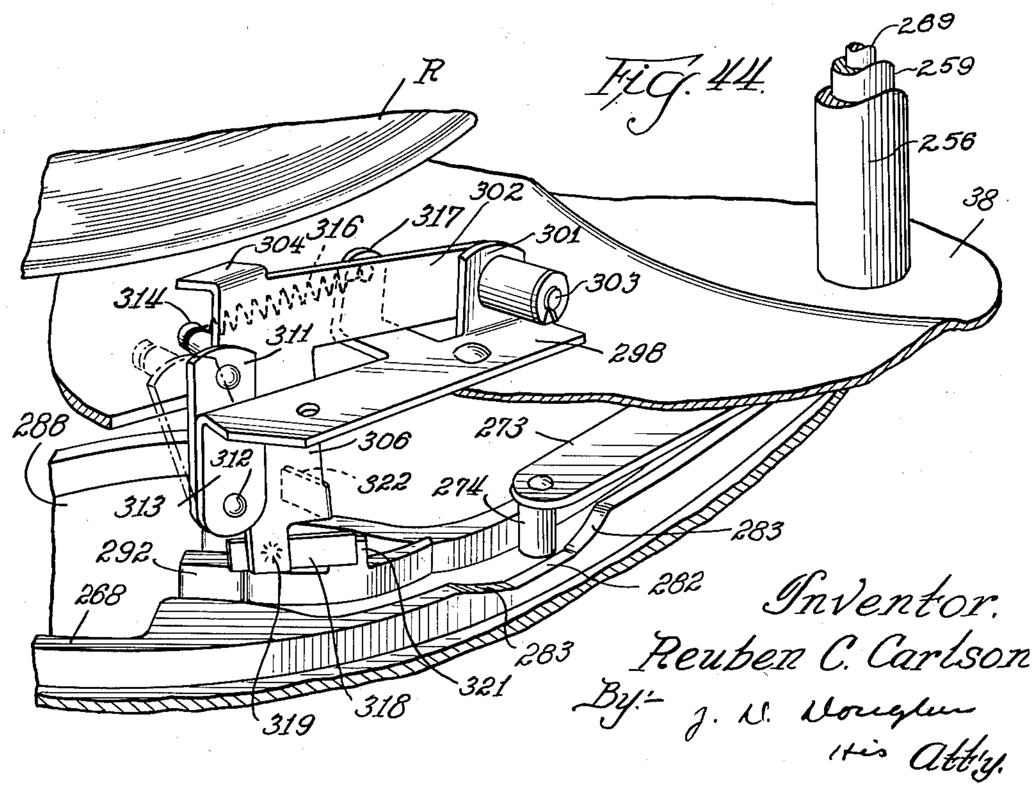

Fig. 19 is also a fragmentary elevational view corresponding to Fig. 6 showing the position of the parts when a record is in a state of more advanced engagement by the record slow-down mechanism;

Fig. 20 is a top plan view of the record player shown in Fig. 2, the same being disassociated from the cabinet;

Fig. 21 is a bottom plan view of the same;

Fig. 22 is an elevation of the mechanism shown in Fig. 6 as viewed in a direction from left to right, parts being broken away and other parts in section to reveal the formation of other parts;

Fig. 23 is a vertical section taken on line 23—23 of Fig. 21;

Fig. 24 is a vertical section taken on line 24—24 of Fig. 21;

Fig. 25 is a vertical section on line 25—25 of Fig. 23;

Fig. 26 is a vertical section on line 26—26 of Fig. 24;

Fig. 27 is a section on line 27—27 of Fig. 20;

Fig. 28 is a section on line 28—28 of Fig. 20;

Fig. 29 is a section taken on line 29—29 of Fig. 28, the flap being in elevated position;

Fig. 30 is a section on line 30—30 of Fig. 28, parts being in a different position with respect to Fig. 29;

Fig. 31 is a vertical section taken on line 31—31 of Fig. 20;

Fig. 32 is a fragmentary elevational view of the spindle showing its relationship to a record at one stage of its engagement with said spindle;

Fig. 33 is a view corresponding to Fig. 32 showing the record at another stage of engagement with the spindle;

Fig. 34 is a fragmentary top plan view of the cam gear and portions of parts adapted to be operated therefrom;

Fig. 35 is a vertical section taken on line 35—35 of Fig. 34;

Fig. 36 is a vertical section taken on line 36—36 of Fig. 34;

Fig. 37 is an elevational view of the cam wheel and portions of related parts;

Fig. 38 is a fragmentary vertical section taken on line 38—38 of Fig. 20;

Fig. 39 is a fragmentary vertical section taken on line 39—39 of Fig. 20;

Fig. 40 is a fragmentary plan view of the motive unit and adjacent parts;

Fig. 41 is a vertical section on line 41—41 of Fig. 40;

Fig. 42 is a diagram of the electrical circuit employed for controlling operation of the record player;

Fig. 43 is a fragmentary perspective view of the cam gear track switch and cooperative mechanism in association therewith;

Fig. 44 is a view corresponding to Fig. 30, some of the parts being in a different position;

Fig. 45 is a vertical section taken on line 45—45 of Fig. 2;

Fig. 46 is a vertical section on line 46—46 of Fig. 45;

Fig. 47 is a vertical section taken on line 47—47 of Fig. 45; and

Fig. 48 is a horizontal section on line 48—48 of Fig. 47.

In Fig. 1, wherein for the purpose of illustration, is shown one embodiment of the invention, the reference character 1 is used to denote a cabinet, in its entirety, commonly known to the trade as a console. The space within the left hand side thereof is devoted to phonograph record reproducer apparatus while the space at the right of the cabinet may be devoted to television or radio receiving apparatus. The cabinet is intended to house fully automatic record playing apparatus; that is, apparatus to which records differing in size and in any order may be fed in an informal manner after which a mechanism X, within the cabinet, automatically manipulates the records; the same being played, subject to remote control, and after playing are automatically passed out of the control of mechanism X. Consequently, a slot 2, preferably in the front of the cabinet, is provided for passage therethrough of the records to be reproduced by the mechanism X. Beyond the slot 2; that is, within the cabinet, the records are normally not touched by the hands of an operator until they have been discarded by the mechanism X. As will be noted, the record player mechanism X is positioned above the level of a door 3, hinged to one corner of the cabinet, which is adapted to close an aperture or doorway 4 in the lower portion of the cabinet. The aperture 4 opens into a storage space 6 (Fig. 2) suitable for records contained in albums 7. A vertical wall 11 separates the space 6 from a rejected record compartment 8 where records are adapted to accumulate, after they have been released from the mechanism X, and from which they are readily removed through the aperture 4.

The slot 2 extends vertically and is sufficiently wide to accommodate from one to three or four records at a time. In the course of their passage from the slot 2 to the rejected record compartment 8, but one side of each of the records is reproduced. To reproduce the remaining sides it is necessary to again pass the records through the slot 2, after reversing the position of the sides of the respective records.

To accommodate records that have been reproduced by the mechanism X, the compartment 8 is normally closed by means including the door 3 and insulated against noise produced by contact of the records one with another as they are dropped from mechanism X. Provision is also made to assure the records finding a predetermined position in the rejected record compartment 8 as they come to rest therein. This is effected by means of an inclined wall 9 which slopes downwardly from a point near the upper edge of the wall 11, to an inclined bottom wall 12 slanting downward from a wall 13 of the cabinet 1. While the door 3, when closed, will absorb some of the noise created by the records entering compartment 8, the noise insulating quality of the compartment is additionally improved by a pad 14 of suitable fibrous material such as felt which overlies the walls 9 and 12. The same material in the form of pads 16 is appropriately fastened to the door 3 and a rear wall 17 of the cabinet 1.

Figure 3:
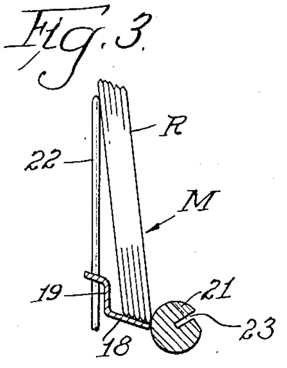
Fig. 3 is a diagrammatic view of magazine mechanism of the improved record player, in end elevation, the transfer cylinder being in section.

The manner in which a record is treated after it is passed through the slot 2 is indicated diagrammatically by Fig. 3. Therein an accumulation or group of records R are supported on their peripheral edges in a magazine M. It comprises a base member 18, a prop member 22 and a rotary member 21. The base and rotary members extend horizontally and are shown in vertical section. When the records leave the hand of an operator they roll to a stop somewhere intermediate the ends of base member 18 and due to inclination of said member laterally thereof they concurrently slide to the right until their motion is interrupted by engagement with the rotarily movable member 21. The inclination of member 18 causes the records to topple to the left as their bottom portions are displaced to the right so that they come to rest in a near-vertical position in which they lean against the prop member 22.

Of all the records in magazine M that record which is nearest the rotary member or cylinder 21 will be referred to hereinafter as the "end record." It is the first record to be removed from the magazine as will be apparent in viewing Figs. 4 to 8 inclusive. On removal of the end record, the next succeeding record assumes the role of end record, gravity and the slant of member 18 providing for displacement of the remaining records of the magazine toward the cylinder until by the process of their successive removal said magazine is exhausted. Some records can, of course, be retained in the magazine by pushing additional records through the slot before the magazine is emptied by successive operation of cylinder 21. The position of slot 2 is in such relationship to the magazine M that when replacement records are added to said magazine before it is exhausted the records are pushed into a space between the lower portions of the records, already in the magazine, and a vertical wall 19 extending upward from the higher sides of base member 18. The new records, of course, are adapted to wedge the previous records away from prop member 22. No orthodox rule need be observed when loading the magazine insofar as the order is concerned in which the different sizes of records to be played are fed to the magazine.

Figure 4:
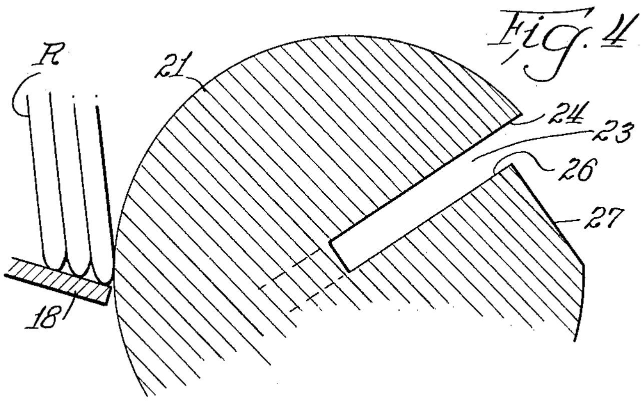
Figure 7:
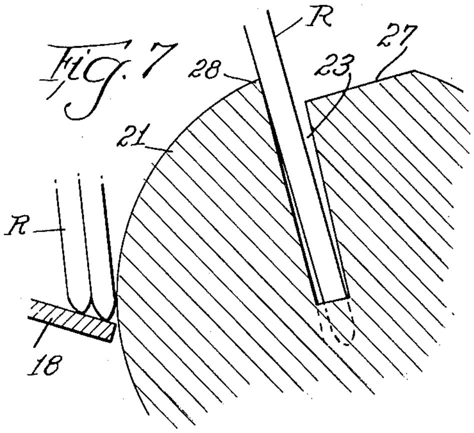
Figure 8:
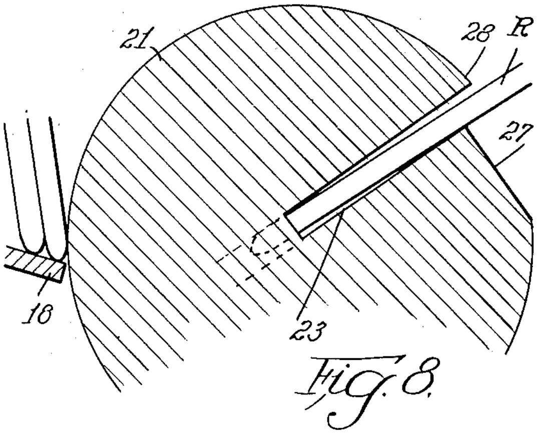

Besides its function of retaining records on the base member 18, the rotary member 21 performs the operation of separating the end record from the rest of the records in the magazine and of removing said end record from the magazine supply for reproduction by mechanism to be described hereinafter. For this process, a cylinder 21 is provided with a slot 23 extending longitudinally thereof. The slot 23 is slightly wider than the thickness of a phonograph record and is, in part, defined by parallel walls 24 and 26. In Figs. 3 and 4 the cylinder is indicated in its normal position wherein it is motionless in one of its extreme positions wherein the opening of the slot is removed from the base member 18. From this position the cylinder is adapted to be continuously rotated, by mechanism later to be described, counterclockwise through one half of a cycle of motion to its second extreme position indicated in Fig. 5. In this position the wall 24 is slightly below the upper surface of base member 18 at the lowermost edge thereof. Also, the continuity of the periphery of cylinder 21 is further interrupted by a flat surface or clearance surface 27 which extends substantially perpendicular from wall 26 to the periphery of the cylinder. When the clearance surface is carried to the position it occupies in Fig. 5, the group of records is displaced to the right into engagement with surface 27. Furthermore, the clearance surface 27 is so spaced from the axis of the cylinder that when said clearance surface is carried into proximity with member 18, as in Fig. 5, the space between surface 27 and member 18 is just adequate for the end record to drop to the support of wall 24 without permitting passage of more than the end record. The cyclic operation of cylinder 21 involves a pause in the Fig. 5 position, which is only long enough the permit the end record to move from the support of member 18 to the support of wall 24. Then the cylinder is rotated, clockwise, back to its Fig. 4 position. In so doing, a corner 28 at the intersection of wall 24 and the periphery of cylinder 21 is moved between the end record (Fig. 6), which is first lifted above the level of member 18 while still deriving support from the prop 22, and the remaining records of the magazine. Then when the second half of the cycle of cylinder 21 has progressed sufficiently for slot 23 to be substantially in line with the end record, said record drops to the bottom of the slot (Fig. 7). Once this status has been established the record is swung away from the support of prop member 22 and the remaining records, as depicted in Fig. 8, the walls 24 and 26 retaining the record against substantial displacement axially thereof with respect to the cylinder.

During the process of its transfer from the magazine, the record is supported by cylinder 21 at two points or regions adjacent the ends of the cylinder. This is best shown in Fig. 9 wherein it will be noted that the depth of slot 23 increases uniformly with the distance from each of the respective ends of the cylinder until at a region centrally thereof said slot divides the cylinder into segments. Once a record drops to the support of the bottom regions of slot 23 the axis of the record automatically assumes a predetermined position with respect to the ends of the cylinder regardless of their diameter or the position they occupied while in engagement with the base member 18.

From the cylinder 21 the end record of the magazine is transferred to a turntable T which is adapted to be rotated about a fixed, vertical axis. The turntable is also adapted to be rotated about an articulated spindle S (Fig. 10) which comprises an immovable base portion 29 to the upper end of which a swingable portion 30 is pivoted at 31. The swingable portion 30 is normally in extension over the turntable T in an inclined direction and is adapted to be swung between its normal position, indicated by full lines, and an upward position indicated by broken lines, the factors for determining these positions being indicated hereinafter.

Another factor which is instrumental in transfer of a record to and from the turntable is a flap member F. It is adapted to be swung about a horizontal axis 32 between turntable T and the cylinder 21 by mechanism later to be described. Flap F embraces at least half of the periphery of the turntable from which it is spaced only enough for it to swing from its normal or low extreme position, below the level of the top of the turntable, to its raised extreme position, indicated by broken lines.

A pair of ejector members 33 (Fig. 13), one of which is associated with either end of the transfer cylinder 21, are adapted to move transversely of the axis of cylinder 21 in timed relationship to the operation of said cylinder and flap F to engage the periphery of a record in the cylinder slot 23 and remove the record from said slot.

Figure 12:
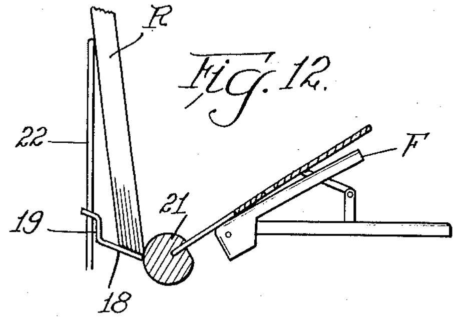
Figure 13:
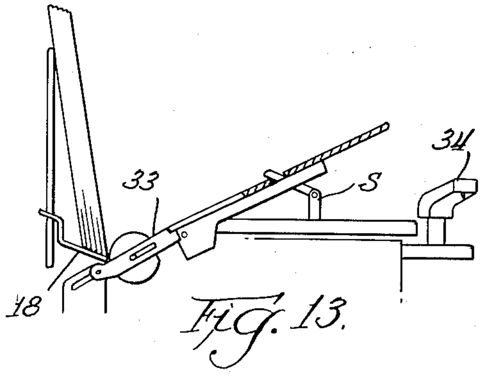
Figure 16:
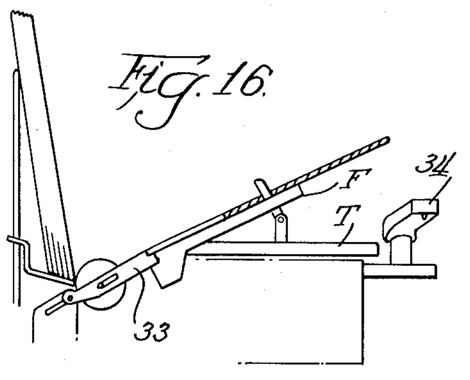

The sequence in which the record transfer elements operate, i. e., cylinder 21, ejectors 33 and flap F, to remove a record from the magazine to the support of turntable T is as follows: Flap F first starts its upward swinging motion. Substantially in the position it occupies in Fig. 12, flap F pauses for a reason later to be disclosed. During this pause, cylinder 21 begins its counter-clockwise motion and immediately thereafter the flap resumes its motion which is then continuous until it reaches the broken line position (Fig. 10). The flap reaches this position at substantially the same time as the cylinder 21 reaches its Fig. 5 position. Then cylinder 21 and flap F simultaneously begin the second stage of their cycle of motion. In this stage, the cylinder having picked up a record from the magazine, rotates continuously, as previously indicated, until it reaches its Fig. 12 position. In the meantime flap F again pauses in its downward motion, at the position it paused at on its upward swing. During the pause, the record being transferred is carried to a state of momentary rest on that portion of the flap which is adjacent cylinder 21, i. e., the heel of the flap, and the free end of spindle portion 30, since the end of the spindle 30 extends through and slightly beyond the plane of the top of flap F (Fig. 12). This free end extends into the vertical plane into which the center holes of the records are gravitationally orientated by the bottom of cylinder slot 23. Consequently, the center hole of the record undergoing transfer is in the same vertical plane as the free end of spindle portion 30 when supported as it is in Fig. 12. Also, while so supported, the ejector members 33 are advanced, from a position wherein their record-engageable ends are at the ends of the cylinder, into engagement with the periphery of the record which the ejectors remove from slot 23 by sliding it edgewise over the free end of spindle portion 30 without displacement of the record's center hole from the vertical plane previously alluded to. During this sliding operation, the center hole of the record is intercepted by the spindle portion 29 over which the record is thus threaded (Fig. 13). The pause of flap F, in the Fig. 12 position, is only long enough to enable the threading operation to take place. Then the flap resumes its downward motion in the course of which the record is carried by said flap down to the support of the turntable (Fig. 14), the flap finally occupying its normal position spaced slightly from the record.

The foregoing description is applicable to both 10-inch and 12-inch records. However, because of the difference in the radii of the records, the center holes of the 10- and 12-inch records do not engage the end of the spindle portion 30 at the same position of the ejector members 33. Thus, when a 10-inch record is slid out of the slot 23 by the ejector members 33, its center hole is not engaged by the spindle 30 until nearly full displacement of the ejector members. However, the center hole of the 12-inch record is engaged almost immediately when it is lowered into position. Thus when the 12-inch record is slid out of the slot 23, the spindle portion 30 must pivot about its pivot point 31 from the position shown in Fig. 15 to that shown in Fig. 16.

During cyclic operation of the foregoing elements, a pickup arm 34, cooperatively associated with turntable T by mechanism later to be described, is swung clear of the course through which the record is carried. After the record has been transferred to the turntable, however, pickup arm 34 is swung inwardly over the beginning of the sound groove of the record and lowered into engagement therewith by mechanism to be described hereinafter. The pickup arm 34 is carried across the record by the movement of its sound groove as the record is reproduced. When the pickup arm reaches the terminal groove or trip groove of the record, trip mechanism, later to be described, is operated by the peculiar kind of motion imparted to the pickup arm by said terminal groove. This results in another cyclical operation of the elements alluded to, by mechanism to be described hereinafter.

Figure 14:
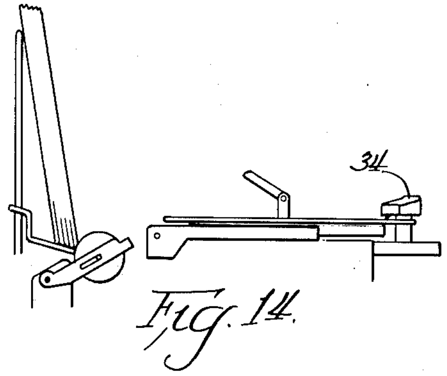

Although the elements indicated in Fig. 14 are represented as in the positions they occupy when a record is being reproduced, a more detailed view of their position, besides other elements, are indicated in Fig. 17. From the position it occupies on the turntable, the record is removed by cyclical operation of the flap F. In this operation, the record is lifted from turntable T by the flap, is swung clear of the free end of spindle S immediately on disengagement from which the record is displaced, by gravity, edgewise down the inclined surface of the flap until said record strikes cylinder 21. It is deflected therefrom by operation of the flap and then during continuance of movement of said flap toward its uppermost position (Fig. 10) the record drops until it is intercepted by a resilient roller 36 over the surface of which it is oriented by gravity, into the restraining grasp of said roller and a cooperating roller 37. The pair of rollers 36 and 37 are adapted to offer resistance to movement of the record in its passage downward from the flap to the rejected record compartment as will be indicated hereinafter. Other steps in the transfer of the record away from the turntable are indicated in Figs. 18 and 19.

*Structure of frame and connection with cabinet*

The structure of the mechanism X comprises a frame best shown in Figs. 17, 20 and 21. It is formed preferably of parts struck from some suitable sheet metal and includes a base plate 38 which has secured to its opposite edges lateral members 39 and 41 (Fig. 20). The base plate 38 is of generally rectangular formation and has an apron 42 extending downwardly from the edge thereof to add rigidity thereto. The lateral members 39 and 41 are of generally similar formation, being L-shaped in vertical cross section, and their rigidity is improved by flanges 40 and 43 extending toward each other throughout the length of the base of each of the members. Additionally, a flange 44, extending laterally from the upper edge of the member 39, and a flange 46, extending laterally from the upper edge of member 41, overlie plate 38 to which they are rigidly coupled in any convenient manner. The opposite ends of the lateral members 39 and 41 are tied together by a base beam 47. Beam 47 is L-shaped in cross-section and provided with an upwardly-bent flange 48 (Fig. 22) at either end thereof through which screws 49 extend to couple the flanges to lateral members 39 and 41. Additionally, beam 47 has, in extension upwardly throughout the length of one of its sides, a flange 51 for the sake of rigidity. Rigidly attached to the lateral member 39, but spaced uniformly therefrom, is a guide plate 52 (Figs. 22 and 24). It is generally rectangular in formation and bears, in extension laterally of the top thereof, a pair of studs 53. As illustrated in Fig. 25, ends 54 of the studs are of reduced diameter and are in extension most of the way through member 39 which abuts shoulders 55 against which screws 56, threaded in the studs, draw the lateral member 39. The guide plate 52 is additionally coupled to member 39 by means including a pair of bolts 57 (Figs. 23 and 26) each of which has a flange 58. The bolts extend through guide plate 52 which is pinched between their ends, which are upset as at 59, and the flanges 58. Also the bolts have threaded end portions 61 of reduced diameter thereby providing shoulders 62. The end portions pass through member 39 which is clamped against shoulders 62 by nuts 63 to space the lateral member from plate 52 by a distance equal to the spacing provided by studs 53. The record player mechanism is therefore provided with a fabricated frame which is rigid and inexpensive of construction. It is further strengthened by the base member 18, later to be described.

For support of mechanism X the cabinet 1 includes a side rail 64 (Fig. 2) and a central rail 66 from both of which mechanism X is spaced, at its four corners, by resilient cushioning members 67 but to which the mechanism is anchored by any suitable means.

*Construction of magazine*

The structure and formation of base member 18 is best indicated in Figs. 20, 22 and 24. It is also constructed of some suitable sheet metal and includes at either end thereof a flange 68 (Fig. 24) extending downwardly. One of the flanges is rigidly coupled to the lateral member 41 while the remaining flange is similarly coupled to the guide plate 52, preferably by screws 69. The base member 18 includes, in addition to the rear wall 19, an inclined flange 72 throughout the length of said rear wall at its top portion. Flange 72 provides means to support the prop member 22 which is of some suitable metal rod bent to the shape of an inverted U (Fig. 1). The arms 73 (Fig. 18) of the U-shape extend through the flange 72, downward to lateral extensions or anchor portions 74 in extension through flange 51 to which the anchor portions may be secured by any suitable means.

As has already been indicated, an element of the magazine M is the transfer cylinder 21. It may be of suitable metal or plastic such as Bakelite and bears pintles or shafts 77 and 78 extending axially of either end thereof (Fig. 9 and Fig. 20) and in rigid relationship thereto. The end of shaft 77 has, axially thereof, a bore 79, as a bearing in which is received a shouldered stud 81 extending from the guide plate 52 to which said stud is riveted. The shaft 78, on the other hand, includes an end section 82, of reduced diameter, which extends into a bore 83, axially of a screw 84 threaded into the lateral member 41. By inserting or removing shims or washers 86 between the head of screw 84 and member 41 and/or washers between the end of shaft 77 and a flange 87 on stud 81 the position of the transfer roller is adapted to be varied axially thereof. The axial variation of the position of cylinder 21 provides means by which the position of the axis of a record carried thereby may be adjusted to assure proper threading of the centerhole of the record onto the spindle portion 30.

*Flap and relationship to frame*

As previously indicated, the flap is adapted to be rocked about the axis 32 (Figs. 10 and 11). The provisions for this are best indicated in Fig. 27 wherein it will be noted that adjacent the lateral member 41 the structure of the flap includes an ear 88 which is struck downward. On the opposite side thereof, adjacent plate 52 the flap also includes a second ear 89 also extending downwardly. Ear 89 is adapted to swing about a shouldered screw 91 which is riveted to guide plate 52. The ear 88 also is adapted to swing about a stud-end portion 92 of a screw 93 which is threaded in member 41, both screws being on axis 32. In spaced relationship to axis 32 and parallel thereto, ear 89 carries a follower 94 for cooperation with cam means, later to be described, by which the flap is adapted to be swung about axis 32. Continuing from the ears 88 and 89 are flanges 98 (Fig. 18) of reduced width to add rigidity to a pair of arms 95, while between the ears a web 97 is in extension to also add to the rigidity of the flap. Preferably, the flap F is arcuate at 98 about the axis 32 to allow the records to slide easily off the flap and down between the rollers 36 and 37. Passage over the flap may be further facilitated by surfacing of its upper side with some suitable vibration absorbent material such as a finely comminuted fibrous element, applied by flocking. By its use, the noise of impact of a record, on striking the flap, is eliminated.

The longitudinal continuity of the arcuate portion 98 of the flap is broken by slots 99 for the sake of clearance for movement of the ejector members 33.

Mechanism is provided to offer momentary resistance to edgewise movement of a record over the flap F when the record has been lifted clear of the spindle S. This mechanism is best shown in Figs. 28, 29 and 30. It includes a friction pawl 102 pivoted by a shouldered stud 103 to a lug 104 struck downwardly from each of the arms 95. Above the studs, the pawl bears a laterally extending finger 106 which extends slightly above the upper surface of the arms 95. Finger 106 is preferably arcuate, in transverse section, of the stud 103, and is also surfaced with some friction-increasing element such as rubber. A convenient method of applying a desired surface to finger 106 is to stretch a section of rubber tubing 107 thereover. As will be noted, the pawl 102 is pivoted at a point below the side of a clearance aperture 108 (Fig. 29) nearest axis 32. It is biased into the Fig. 29 position by means of a spring 109, coiled about stud 103, which has arm portions 111 extending upwardly and laterally into intimate pressure engagement with the opposed edges of lug 104 thereby also retaining pawl 102 in substantial registration with lug 104. When, however, a record is initially slid over the surface of the flap F, the record engages finger 106 and swings it counterclockwise, against slight resistance of spring 109, until the record rests on the surface of the flap over which it is urged by the ejector members 33. The record then comes to rest on the turntable, the flap having been lowered below the level thereof and spring 109 is permitted to return the pawl to its Fig. 29 position. On upward movement of flap F, the record is lifted from the turntable by fingers 106 which do not change their position during the first half of the cyclic motion of said flap. Therefore, as the inclination of the flap is increased, in its upward motion, the record is detained on the flap for a predetermined short period, by fingers 106 even after the record has been carried out of engagement with spindle portion 30. This supplementary detention of the record enables the cylinder slot 23 to be turned from its normal position to a point where it will not be in position to receive the record when it is released from the flap.

*Record ejector mechanism*

As previously indicated, the ejector members or ejectors 33 (Fig. 17) are necessary for removal of records from the slots 23 of cylinder 21 and also for threading the records over spindle S. These ejectors 33 are elongated links preferably struck from some suitable sheet metal and provided with slots 112 through which roller shafts 77 and 78 extend. The ejectors 33 are confined between the cylinder 21 and a collar 113 on each of the shafts 77 and 78 (Fig. 20) and are adapted to be moved in a straight line, substantially parallel with the top surface of flap F when said flap is poised in the position indicated in Figs. 12 and 15. Thus there is no moment of force tending to lift the record from the turntable or to force it against the top surface of the turntable when the ejectors are operated. To confine the motion of ejectors 33 to a straight line, brackets 114 and 115 are provided extending upwardly from the beam 47 (Fig. 22). Each of the brackets 114 and 115 has an inclined slot 116 at the top thereof through which a stud 117 extends laterally from the end of each of the ejectors 33. Each of the studs 117 also extends through a slot 120 at the end of an arm 118 rigidly secured to a shaft 119. One end of the shaft 119 is of reduced size at 121 (Fig. 22), and is journalled in an ear 122 (Fig. 19) on the bracket 115. The remaining end of shaft 119 has, axially thereof, a bore 123 in which is received a shouldered stud 124 carried by the guide plate 52. A crank arm 126 having a collar 127 at one end is held in fixed position on the shaft 119 by a set screw 125, and also bears a follower 128 at its other end by which said shaft is adapted to be rocked by cam means to be described hereinafter. The free end of ejectors 33 include fingers 129 to safeguard against displacement of a record downward and from a state of engagement with the ejector when the record has been removed from the cylinder slot 23.

*Record lowering device*

It is desirable that the speed at which the played or rejected records descend from the flap F be controlled or modified to decrease noise of impact of the records when their fall is arrested in the compartment 8, and to decrease the possibility of chipping or otherwise damaging the records especially when a record collides with another already in the compartment. A mechanism L (Figs. 17 and 22) is therefore provided to prevent records from acquiring too great a speed after they have been disengaged from the flap F.

The mechanism or "lowering device" L forms a part of the subject matter of my copending application filed on July 29, 1949, Ser. No. 41,388, and is not, therefore, a part of the present invention. It is timely to say, however, that mechanism L includes the rollers 36 and 37 (Figs. 19 and 22) one of which is supported on either side of the course passed through by a record on its way from the flap to compartment 8. The roller 36 is rotatably supported between two arms 133 on a shaft 135 which is, in turn, adapted to be carried about a pin 136 supported from beam 47 by brackets 137. Coiled about pin 136 is a spring 138 which is adapted to bias roller 36 toward roller 37. The roller 37 rotates about a fixed axis provided by a shaft 139 which is carried by a pair of arms 141 extending downward from base plate 38. The two arms 141 are together embraced by a U-shaped yoke 142, pivoted to arms 141 by a pin 143. The arms 141 each have slots 144 therein, arcuate of pin 143 so that a shaft 146, supported from the swingable ends of yoke 142 and passing through slots 144, may be moved within the limits of the slots. Journalled on the shaft 146 is a flywheel or weight 147 having a pulley portion 148 adapted to drivingly engage roller 37. The inertia of weight 147 and the comparatively large force required to change its speed has a modifying effect on the speed of descent of a record as long as it remains engaged by the rollers 36 and 37.

*Support and drive for turntable*

Centrally of the base plate 38 and at a predetermined distance from the magazine M, an aperture 149 (Figs. 35 and 38) provides means by which a bearing frame 151 is positioned with respect to the magazine and other elements of the record player, later to be referred to. The frame 151 is of rectangular formation and includes a flat top surface 152 centrally of which is an annular flange 153 adapted to fit closely within the aperture 149 when the surface 152 is clamped to the plate 38 by screws 154. The turntable T includes a hub 156 axially of and in rigid communication with which is associated a tubular shaft or sleeve 157. In the upper wall of the frame 151, a boss 158 is formed in which a bushing 159 is disposed to provide a bearing for shaft 157. On either side of the sleeve 157, and spaced therefrom, the frame 151 includes vertical arms 161 and 162 which are joined at their lower ends by a transverse portion 163. The transverse portion includes a boss 164 in which is provided a bore 166, coaxial with the bushing 159. The boss 164 is provided with a counterbore 167 in which a bushing 168 is frictionally mounted to provide a second bearing for the shaft 157. As will be noted, the bearings provided by bushings 159 and 168 retain the shaft 157, and consequently the turntable T, against lateral displacement. Also, as will be noted, the shaft 157 does not engage the bottom of counterbore 167. This is because the weight of the turntable is supported on the frame 151 by means including a ball thrust bearing 169, of conventional construction, separated from the frame 151 by a suitable vibration damping washer 171, and from the hub 156 by a similar washer 172.

In order to drive the turntable T, a motive unit 173 (Figs. 21 and 40) is supported below an aperture 174 in the base plate 38. Although the motive unit 173 includes a motor 176 and mechanism adapted to operate the turntable T at two speeds, such as 33⅓ R. P. M. and 78.26 R. P. M., the structure of the motive unit does not enter into the novelty of the invention. Consequently, it will not be described in detail. The change in speed of the turntable is regulated by turning a handle 177 (Fig. 20) which is supported on a shaft 178 passing through base plate 38. Shaft 178 bears a crank arm 179, the end of which is pinned to one end of a link 181. The remaining end of said link is pinned to one of the ends of a composite lever 182 adapted to be rocked about the axis of a constantly-driven motor shaft 183. The motive unit 173 includes a floating idler 184 which is biased by pressure of a spring 186 (Fig. 41) into concurrent engagement with motor shaft 183 and a depending peripheral flange 187 of the turntable T. The lever 182, on the other hand, supports a stepped idler 188 which is drivingly coupled by a belt 189 to the shaft 183. When the motive unit is adjusted to rotate the turntable at 78.26 R. P. M., the motor shaft is frictionally engaged with the idler 184 to drive the turntable through its rim 187. However, when it is desired to change the rotative speed to the lower value, the lever 182 is moved counterclockwise by the linkage previously described. By this motion, the smaller diameter 191 of the stepped idler 188 is pressed against the rim of idler 184 and forces it out of engagement with the motor shaft 183. Thus, the drive is from the shaft 183 through the belt 189 and stepped idler 188 to the turntable. The ratio of the smaller diameter step 191 to the larger step 190 may be varied, but it is preferred that it be such as to provide a speed of 33⅓ R. P. M. when the step 191 is engaged with idler 184 and 78.26 R. P. M. when the motor shaft 183 is thus engaged. A slot 193 in the end of the lever 182, through which a pin 192 extends defines the limits of movement required to shift between the two speeds.

In order that the handle 177 may be accessible to an attendant, the front of the cabinet 1 may be provided with a door 194 which may preferably hinge along its lower edge and be opened and closed by grasping a knob 196 at the top thereof. The door 194 also provides for removal of records from the record player in an emergency and access to the record player for servicing it.

*Spindle and support therefor*

Novel features are incorporated in the spindle S (Fig. 38). It includes, in addition to the portions 29 and 30, an anchor or base portion 197 which is of reduced diameter and received within the tubular shaft 157 wherein it is rigidly held by set screws 198 threaded in the lower boss 164. The diameter of the anchor portion 197 is slightly less than the internal diameter of the sleeve 157 so that said base portion 197, throughout its length, is segregated from vibrations or lateral play of the shaft 157. Also to this end, a shoulder 199 at the base of the intermediate portion 29 is spaced slightly from the turntable T. The upper end of portion 29 is split by a slot 201 (Fig. 33) in which is received one end of the guide portion 30, the same being pivotally anchored therein by the pin 31.

As previously indicated, the pivoted portion 30 is normally inclined with respect to the axis of the base portion 29. In order that this may be carried out, an abutment surface 202 on the pivoted end of portion 30 is adapted to engage the bottom of slot 201 thereby restricting the rotation of said pivoted portion counterclockwise to a predetermined position as indicated (Fig. 32). In this position, the portion 30 is inclined with respect to a horizontal only enough to provide for sliding of a record thereover, by gravity, to the turntable. Although the inclination of portion 30 from the horizontal is from 20 degrees to 30 degrees an inclination of about 25 degrees has been found to be satisfactory. In order to safeguard against rotation of the portion 30 beyond a position in which the center of gravity thereof is to the right of the axis of portion 29, it is provided with a second abutment surface 203 which is also adapted to engage the bottom of slot 201 and thereby prevent rotation of portion 30, clockwise, beyond the position it is indicated in Fig. 33.

*Record transfer actuator mechanism*

As has already been indicated, the turntable T is constantly driven from the motor 176, the tubular shaft 157 (Fig. 38) being rotated with the turntable. Parallel to shaft 157 is a stationary shaft 204 (Figs. 21 and 35) on which a master cam or cam wheel 206 is rotatable. At its upper end, the shaft 204 is of reduced diameter at 207 and threaded to receive a nut 205 by which it is held in clamped relationship to the base plate 38, a lockwasher 208 assisting in the clamping. As means for additional support of shaft 204, the lower end thereof is also of reduced diameter at 209 and threaded so that by means of a nut 211 and lockwasher 212 the shaft is adapted to be secured to a bracket 213 which, in turn, is bolted to the transverse portion 163 of the frame 151 (Fig. 38).

The cam wheel 206 includes a hub 214 extending from bracket 213 to the base plate 38. Integral with the master cam 206, at the periphery thereof, are the teeth of a mutilated gear 216, adapted to mesh with the teeth of a shrouded pinion 217 rigidly mounted on the shaft 157. The continuity of the series of teeth of gear 216 is interrupted by a blank space or gap 218 (Fig. 34) in which the pinion 217 is normally disposed and therefore there is normally no driving communication between the pinion and master cam. This normal position of the cam 206 is the position it occupies during the reproducing of a record. When the reproducing operation has been completed, the cam wheel is rotated sufficiently, by mechanism later to be described, to create meshing engagement between gear 216 and pinion 217. The wheel 206 is then rotated through one complete revolution or cycle of rotation until the blank space 218 is carried back to the pinion 217 whereupon the gear 216 thus automatically loses its driving communication with pinion 217, and the wheel stops. During a cycle of rotation of the wheel 206, a played record is removed from the turntable T by the flap F and in operative sequence an unplayed record is removed from the magazine and transferred to the turntable as previously described. During rotation of the gear 216, the record player is said to be "in cycle."

In order that operation of the cam wheel 206 may be utilized to operate the transfer cylinder 21 and flap F, rotative motion of the cam wheel 206 is translated into reciprocatory motion of a longitudinally slidable cam plate 219 (Fig. 23). This is effected by a lever 221 (Fig. 21) pinned at 222 to a lug 223 extending laterally of the frame 151 (Fig. 38). On the lower side thereof, the cam 206 has an endless cam groove 224 (Fig. 21) into which a follower 226, on the lever 221 extends. The remaining and swingable end of lever 221 is bifurcated as at 227 to engage a pin 228 supported from the cam plate 219 by a bracket 229. If desired, the bracket 229 may be adjustably coupled to the cam plate by bolts 230 passing through slots 235 extending horizontally of the cam plate.

The cam plate 219 (Fig. 23) is rectangular in general formation, and preferably constructed of sheet metal. It also is slidably anchored to the lateral member 39 (Fig. 26) as follows: That portion of each the bolts 57 which is between member 39 and plate 52 carries an annular bearing 231 in extension through a horizontal slot 232 in the plate 52; furthermore, the bearing is confined between the flange 58 and member 39 to prevent axial displacement thereof. Each of the bearings 231, further, has an annular flange 233 between which and the flange 58, the plate 219 is confined. As will be noted, the plate 219 is supported on the bearings 231 which pass through the plate at a level about midway between the top and bottom edges thereof. Therefore, to overcome a tendency of the plate to tip about its bearings, and to improve the bearing relationship of plate 219, with respect to members 52 and 39 it is provided, at one corner thereof, with a boss 234 protruding laterally of the plate and adapted to engage the member 52, while a similar boss 236, also in lateral extension from the opposite side of the top of plate 219 also extends into engagement with the member 39. Since tipping, and consequently binding of the plate about its bearings is thus obviated, a suitable lubricant such as grease can be retained between the cam plate and members 39 and 52 for a long period of time. Due to this construction a minimum of friction is encountered as the cam plate 219 is moved longitudinally.

A plurality of cams in the nature of slots are formed in the cam plate 219. Near its upper edge plate 219 is apertured by a cam slot 237 in which is received the follower 94 (Fig. 27). Follower 94 extends from the ear 89 of the flap F in parallel relationship to flap axis 32, and through a slot 239 in plate 52, which is arcuate of the axis 32 to afford freedom of movement of the follower. Near its base, plate 219 is apertured by a cam slot 241 in which is received the follower 128 which, as previously indicated, is coupled to the ejectors 33. Follower 128 extends through an arcuate slot 242, in plate 52, for the sake of clearance. Between the slots 237 and 241 is a third slot 243 in which is received a follower 244 rigidly coupled by a crank arm 246 to the shaft 77. Action of follower 244 is within an arcuate clearance slot 247 in the plate 52.

When a record is being reproduced followers 128, 94 and 244 are in the positions they occupy in Fig. 23. When the cam wheel 206 is moved through a cycle, cam plate 219 is concurrently operated, its operation involving movement from its full line position to the position which is indicated by broken lines and back to its full line position. At the start of the cyclic operation of cam plate 219 follower 94 is immediately moved by an abrupt rise 248 at the right end of cam 237 until flap F has reached the position in which it pauses as indicated in Figs. 12 and 15. The flap is retained in this position by engagement of follower 94 by a dwell portion 249 of cam slot 237. At the end of the dwell 249 follower 94 is controlled by an arcuate portion 251 which serves to raise the flap rapidly at first from its paused position, then gradually to bring the flap to a state of rest at the end of the first half of the cyclic operation of cam plate 219. As the direction of movement of the cam plate 219 is reversed, the operation of the flap takes place in reverse order to what has been indicated.

The follower 244, meanwhile, remains in a dwell portion 252 of cam 243 during a part of the first half of a cycle whereafter the follower is moved slowly, then quickly and then slowed to a gradual stop, thus moving the transfer cylinder 21 similarly. During the second half of its cyclic motion, the follower 244 is brought to a gradual stop just before it enters the dwell portion 252. This provides for slowing of a record to a stationary position after it has been removed from the magazine M so that the record may be then ejected from the cylinder slot 23. The follower 128 operates the ejectors at the beginning of a cycle. However, since there is no record in the position to be engaged by them, this motion is not utilized by the changer. The ejectors are then held stationary as the follower 128 is moved over by a dwell portion 253 of cam 241. At the close of a cycle of its operation, cam 241 again actuates follower 128 to operate the ejectors 33 and thereby transfer a record from cylinder 21 to the support of flap F, as was more completely explained previously.

*Support and control of pickup arm*

The means to govern the position of the pickup arm 34 wtih respect to the turntable T includes a tubular column 256 (Fig. 39) having at the base thereof a section 257, of reduced diameter passing through the base plate 38, the section 257 being rolled over or riveted at 258. The column 256 is thus held in vertical relationship to the plate 38 so that a sleeve 259, journalled within the column is rotatable about a vertical axis. The sleeve 259 is anchored against downward displacement by a coupling 261 adjustably secured to the sleeve by a set screw 262. The coupling 261 bears an outwardly and upwardly extending arm 263 from the end of which a pair of arms 264 formed of spring metal are supported and extend horizontally and in spaced relationship to each other. From the top of the pickup arm 34, a pair of arms 266 extend downwardly to embrace the arms 264 and to which they are pivoted by a pin 267 passing horizontally through the two pairs of arms. The column 256 is so positioned with respect to an annular and vertical motion cam 268, on the cam wheel 206, that a lift rod 269, journalled centrally of the sleeve 259 will rest against the cam 268 and be moved axially by said cam when it is rotated. At the upper end thereof, the rod 269 carries an adjustment screw 271 threaded in the rod. The screw 271 and rod 269 being adapted to sustain the pickup arm 34 as its weight urges it downwardly about the pin 267, it follows that differences in the height of the cam 268 are adapted to swing the pickup arm about said pin. The screw 271 provides for vertical adjustment of the needle end of the pickup arm.

The pickup arm 34 is adapted to be swung laterally by means including a lateral motion cam 272 (Figs. 34 and 35) adjacent the cam 268 and preferably forming an integral part of the cam wheel 206. In order that motion provided by the cam 272 may be imparted to the pickup arm, the lower end of the sleeve 259 has, rigidly fastened thereto and extending radially thereof, a cam arm 273 which carries at its swinging end a downwardly extending follower 274 adapted to engage the cam 272. As will be noted, the cam 272 takes the form of a groove only wide enough, for the greater part of its length, to accommodate the follower 274. At one extremity thereof, an inner wall 277 of the groove diverges as at 278 from an opposed or outer wall 279 and extends toward a region centrally of the wheel 206 to a wall section 281. During the operation of reproducing a record, in which the wheel 206 is in a normal position, the follower 274 is adjacent the wall 281, which wall is shaped to provide clearance and free movement for the follower (Fig. 34). Also during its normal position, and until the needle of the pickup arm reaches the end of the sound groove of the record being reproduced, the follower 274 is remote from the wall section 278. At the same time, the lift rod 269 rests against a dwell or depression 282 (Fig. 44) in the vertical motion cam 268. When, however, the pickup arm reaches the end of the sound groove of a record, a trip mechanism, later to be described, starts the wheel 206 rotating counterclockwise. This causes the lift rod 269 to ride up an inclined surface 283, one of which extends from either side of the dwell 282 to the top of the cam. In so doing, the lift rod 269 rocks the pickup arm about the pin 267 thus disengaging the pickup arm from the record it has been tracking. When the pickup arm is free of the record, the follower 274 is then engaged by the wall section 278 against which the follower is forced to slide by rotation of the wheel 206 until said follower enters the cam groove 272 where it is confined between the walls 277 and 279. Since the follower 274 is swung in a direction away from shaft 204 by the wall section 278, the pickup arm 34 is also swung away from the spindle S until at the position where follower 274 is in the groove. The pickup arm occupies a position sufficiently remote from the turntable to allow a record to be transferred thereto or removed therefrom without striking the pickup arm. During the interval of time when it is necessary for the pickup arm to be free of a record, the lift rod rests on the top of cam 268, which is of uniform height throughout its surface except at the dwell 282 and inclined surfaces 283. Also while the follower 274 is in the groove, the lever 221 is operated by the cam 224 thereby providing for removal of the played record from the turntable and replacing it with an unplayed record by the mechanism already described.

A track switch 284 (Figs. 34 and 36) is employed to determine the "let-down" position of the pickup arm; that is, the position of lowering the pickup needle into engagement with the begining of the sound groove of an unplayed 10-inch or 12-inch record. Since the let-down position of the pickup for a 12-inch record differs from that for a 10-inch record, it follows that when the wheel stops turning on completion of a cycle of rotation and occupies a normal position, the follower 274 must occupy either of two possible positions depending on whether a 10-inch or 12-inch record is on the turntable. Therefore, it is in accordance with the construction and operation of the mechanism that the track switch or gate 284 normally occupies the position indicated by full lines in Fig. 34 wherein the switch is set for manipulation of the pickup arm with respect to 10-inch records.

In detail, the switch is generally arcuate in transverse cross section and includes a downwardly extending pin 286 (Fig. 36) which is journalled in a boss 287, an integral part of the wheel 206. Since it is desirable that just enough friction be provided between the switch 284 and a web portion 288 of the wheel 206 to maintain said switch in place, a suitable compression spring 289 on the pin 286 is provided between a nut 291 on the lower end of the pin and the boss 287. The switch 284 is pivoted to the web 288 in close proximity to a baffle 292 upstanding from the web. Furthermore, the baffle 292 is disposed midway between opposed vertical walls 293 and 294 rising from the web 288, thereby providing channels or end grooves 296 and 297 each of which is just wide enough to operably accommodate the follower 284. Additionally, one end of the baffle 292 extends, substantially, to the arc defining the wall surface 281.

As the follower is guided by the cam 272, during a record changing cycle, it is directed toward the shaft 204 by an inwardly directing or return portion 298, of the groove in the proximity of the switch 284 against which the follower strikes only to be deflected thereby into the groove portion 296. As the follower emerges from the groove portion 296, the wheel 206 automatically stops, due to the notch 218 reaching a point beside the pinion 217. At that same time, one of the inclined surfaces 283 (Fig. 44) passes under the lift rod 269, thereby allowing the pickup to rock downwardly by its own weight. A 10-inch record being on the turntable at the time, the pickup arm engages the beginning of its sound groove, owing to the angular relationship between the arm and follower 274. The follower 274, then being free from the groove 296, moves with the pickup arm as the sound groove on the record carries said pickup arm toward the spindle and the follower 274 toward wall 278, the completion of this motion resulting in another record changing cycle as previously outlined.

When a 12-inch record is deposited on the turntable T a latch mechanism is actuated. It provides for swinging the switch 284 from the 10-inch record position, represented by full lines (Fig. 34), to the 12-inch record position, represented by broken lines. The latch is supported from the base plate and is so positioned, with respect to the turntable T, that when a 10-inch record is manipulated with respect to the turntable, this size of record fails to engage the latch mechanism. In detail, the latch mechanism comprises a latch frame 298 (Fig. 43) which is bolted to the plate 38 adjacent an aperture, 299 therein. The frame 298 is of irregular formation and preferably of sheet metal. At one end thereof, the frame 298 includes an upstanding ear 301 to which a toggle lever 302 is pivoted, at one end thereof, by a pin 303.

Toward one end and at the upper edge thereof, the arm 302 includes a laterally extending pad or finger 304 in position to be engaged by a 12-inch record, and at the same time to be without the periphery of a 10-inch record as it is being lowered to the turntable T. The toggle member 302 is adapted to be rocked about the pin 303 between an upward position indicated in Fig. 43 and a downward position indicated in Fig. 44 by the weight of a 12-inch record as it is deposited on the turntable. The arm 302 also includes a downwardly extending arm 306, one of the edges of which is provided with a pair of notches 307 and 308. A tooth 309, having gently sloping cam sides, is thus provided between the notches 307 and 308. Beside the course through which the tooth 309 is adapted to be carried, is a near-vertically extending link 311 pivoted at 312 near its lower end to the lower end of a finger 313, extending downwardly from the side of the frame 298 toward one end thereof. At its upper end and laterally thereof the link 311 bears a pin 314 which is urged into engagement with one of the notches 307 or 308 by a tension spring 316 anchored to the pin 314 and a lug 317 struck upwardly from the frame 298. The spring 316 is adequate to retain the arm 302 in either of the positions shown in Figs. 40 and 41. When in its downward position, the lower end of the arm 306 is spaced from the cam wheel 206 by a narrow margin, as is also a resilient cam or finger 318 suitably affixed at a point at one end thereof, to a lug 319 at one corner of the lower end of arm 306 to afford lateral movement for the finger. Furthermore, the finger 318 is so positioned with respect to the course that a lug 321, extending upwardly from the switch 284, is adapted to be carried through, that the lug is adapted to strike the finger 318 and to be thereby deflected, thus moving the switch to the broken line position (Fig. 34). The finger 318 is resilient for the sake of safety, for should the switch 284 stick in its 10-inch record position, the lug 321 would merely bend the finger 318 enough to pass it.

It will thus be understood that when in its broken line position, switch 284 is adapted to direct the follower 274 into the groove 297, just beyond which the pickup arm is lowered into engagement with the beginning of the sound groove of the 12-inch record on the turntable.

Since it is desirable that the toggle arm 302 normally be in its raised position, means are provided for moving it from its Fig. 44 position, to its Fig. 43 position. To provide for this, the arm 306 includes a reset arm 322, extending laterally from the base thereof and adapted to be engaged by a reset cam 323 (Figs. 34 and 35). The cam 323 may appropriately take the form of a rod or stiff wire which extends into a hole 324, in web 288, from which it slants upwardly, through a curvilinear course, to an elevation whereat it is adapted to intercept the reset arm 322 when in lowered position (Fig. 44), thence downwardly to a pair of screws 326 about which rod 323 is twisted and clamped for rigid anchorage to the cam wheel 206. The cam 323 is adapted to pass under the arm 322 when said arm is in its raised position (Fig. 43) without engagement therewith.

Provision is also made for returning the track switch 284 to its normal position, i. e., the full line position indicated in Fig. 34. Said provision includes a cam 327 (Fig. 36) extending downwardly from the base plate 38 to which it is bolted. The cam 327 is V-shaped in transverse cross section, and one of its sides is positioned obliquely of the course through which lug 321 is carried. Thus when the switch is set for let-down of the pickup arm into engagement with the beginning of a 12-inch record, the lug 321 strikes the cam 327 after the follower has entered the slot 297, and the switch 284 is moved back to its normal position. When the track switch is set for manipulating the pickup arm with respect to a 10-inch record, the lug 321 is adapted to clear cam 327 in the course of the cam's movement during a record changing cycle.

*Means for controlling the record playing cycle*

A record playing cycle is started by operation of a latch mechanism which, in turn, is adapted to be triggered either automatically or manually. The means to start this cycle comprises a latch, carried by the cam wheel 206, and electromechanical trigger apparatus actuated automatically by the pickup arm or by a switch adapted to be closed manually from outside the cabinet in which the record player is housed. The latch mechanism is adapted to be associated with members fixed to the driven sleeve 157 (Fig. 35). In detail, it comprises a bell crank lever or latch lever 328 pivoted at 329 to a bracket 330 on the under side of wheel 206. Extending radially thereof, the wheel 206 has a slot 332 through which an arm 333 of the lever 329 is adapted to extend. The arm 333 has an eye 334 which is engaged by one end of a spring 336, the other end of which is anchored to the wheel 206 at an aperture 338 (Fig. 34) passing therethrough. Between its respective ends; the spring 336 is coiled about a post 337 in such a way that by its tendency to uncoil, the spring urges the lever 328 clockwise (Fig. 35) about its pivot 329. In its normal position; that is, when the wheel 206 is motionless as when a record is being reproduced, the lever 328 is substantially in a vertical plane with the shafts 204 and 157. Also while in its normal position, the lever 328 is supported in its full line position indicated in Fig. 35 by a cam 339 extending upwardly from the bracket 213. The lever 328 is notched at 341 to provide clearance for a pair of diametrically disposed wings 342 preferably integral with the pinion 217.

When the operation of playing a record is discontinued, a trigger mechanism, later to be described, causes the cam 339 to be displaced slightly out of its supporting position beneath lever 328 to enable said lever to be rocked to its broken line position wherein the lever will be engaged by one of the wings 342. The motion of wing 342 in engagement with the lever 328, moves the gear 206 sufficiently to engage it with the pinion 217. Gear 206 is then turned through a complete revolution at the end of which the lever 328 is engaged by an inclined rise 343, of the cam 339, to be returned thereby to its normal position at the edge of the cam, and the gear 206 is again out of mesh with the pinion 217.

The cam 339 extends downward through an aperture 340 in the bracket 213 and is bent at a right angle to lie along the underside of that bracket. A screw 347 provides a pivot means about which the cam may be rocked by the attraction of an electromagnet 349 on a flange 348 struck downwardly from an arm 344 of the cam extending beyond the pivot point. A spring 351 engaged between a post 352 on the bracket 213 and a downwardly struck lug 353 on the cam member 339, biases the cam in a direction counter to the attraction of the magnet and thus holds the cam in its normal position keeping the lever 328 out of engagement with the wings 342. A stop member in the form of a plate 345 slidably adjustable on the bracket 213 and clamped thereon by a screw 346 holds the cam in its proper position against the urging of the spring 351.

The magnet 349 is attached to the bracket 213 by means of a mounting plate 354 fixed to the magnet. A screw 355 extends through this plate and is threaded into a lug 356 extending outwardly from the bracket 213. Wires 350 leading from the magnet 349 connect it to the actuating switches as described hereinafter through the terminal block 360 mounted on the underside of the plate 38.

It is desirable that means be provided to retain cam wheel 206 releasably in its normal position so that such forces as gravity, when the record player is supported in a position only slightly at variance with a horizontal position for example, will not cause displacement of the wheel from its normal position and thereby cause cyclic operation of said wheel. Therefore, wheel 206 is provided with a pair of horizontally effective cam surfaces 357 and 358 (Fig. 34) between which is a notch or dwell 359 above the gear teeth 216. Cams 357 and 358 are adapted to cooperate with a follower 359 extending downward from one end of a bell crank lever 361 which is pivoted at 362 (Fig. 21) to a bracket 363 on the lower side of base plate 38. Lever 361 is biased clockwise by a tension spring 364 anchored between said lever and the bracket 363 so that as a cycle of the wheel 206 nears completion and follower 359 rides up the incline 357 it is pressed into the notch 359 as the wheel reaches its normal position. The notch is V-shaped in transverse cross-section and consequently cam shaped so that once a cycle of the wheel 206 has been initiated one of the sides defining the notch readily move follower outwardly until it rides inwardly over the cam 358.

The electromagnet 349 is adapted to be energized by either of two switches. They are indicated by the characters 366 and 367 respectively, in the circuit diagram of Fig. 42. As illustrated therein, an electric current from a suitable source 370 is available by means of wires 368 and 369. The switch 366 is normally open and may be positioned at any point on the cabinet 1 (Fig. 1) where it will be convenient for manipulation by an operator. In the present embodiment, the switch 366 is in combination with the knob 196 as also disclosed in my copending application filed on July 29, 1948, Ser. No. 41,388. Momentary closing of switch 366 is all that is necessary to start a record changing cycle.

The switch 367 (Fig. 42) is also normally open but is adapted to be closed automatically when a record has been completely reproduced. The switch 367 is shown in greater detail in Fig. 21. It is supported from the base plate 38 by a bracket 371 in such a position that when the pickup arm reaches the terminal groove of a record, reproduction thereof having been completed, a pin 372 on an extension 373 of the cam arm 273 is carried into engagement with the switch 367 which is thereby closed, thus energizing the electromagnet 349 and starting the record changing cycle.

As a precaution against overloading the magazine M with records, I contemplate use of safety mechanism which is adapted to close the slot 2 automatically when more than a predetermined number of records are placed in the magazine. In Figs. 45 to 48 inclusive is disclosed the safety mechanism. It includes a yoke or guide 401, of U-shaped formation, which is rigidly secured to the internal surface of cabinet 1 adjacent the slot 2. Also adjacent slot 2 are disposed a plurality of pins or screws 402 extending inwardly from the walls of the cabinet and passing through cam slots 403 in a vertically disposed safety bar 404. The yoke 401 includes two arm portions 406 which are offset at 407 to accommodate the bar 404 thereunder and in close proximity to the wall of cabinet 1 adjacent slot 2.

It will now be understood that moving the bar 404 longitudinally upward over the pins 402 is accompanied by displacement of the safety bar laterally, which lateral movement is adequate to cover slot 2 and to prevent ingress of records through the slot. While other mechanism including mechanical and electrical relay means responsive to more than a predetermined number of records may be employed to operate the bar 404, a convenient device involves use of a lever 408, L-shaped in vertical section, which is pivoted at 409 to the rear wall 19 of the magazine M. One end of lever 408 is also pivoted at 411 to the bar 404. Normally, i. e., when the slot 2 is open, the bar 404 is urged to its downward position by gravity and the free end of lever 408 is in slightly spaced relationship to the base member 18 and the rear wall 19. When, however, one more than a predetermined number of records are placed in the magazine, the additional record indicated by the character $R^{\times}$ (Fig. 46) is forced to rest on the lever 408 which is depressed to close the slot 2. While the mechanism as disclosed depends on the position of a last record to be inserted into the magazine to close the slot, I also contemplate operation of the lever 408 by more than a predetermined weight of records, all of which rest on the lever 408, to operate the safety bar 404.

Having thus described my invention in embodiments thereof, I am aware that numerous and extensive departures may be made therefrom without departing from the spirit or scope of the appended claims:

I claim:

1. A phonograph record player having a frame providing stationary magazine members on which a plurality of records are adapted to be supported in near-vertical position a cyclically movable record transfer element disposed adjacent the magazine, the records being adapted to be moved by gravity toward said cyclically movable record transfer element, the element being adapted to normally retain the records in the magazine, said element also having record-receiving means in connection therewith to which the support of the record nearest the record removal element is adapted to be transferred from the magazine members when the record transfer element is moved through a cycle of motion, ejector means in association with said record transfer element to remove the record from the support of said record-receiving means, cyclically operated drive means coupled to said record removal means to actuate said record ejector means, and guide means in connection with said record transfer means and said ejector means to provide a predetermined course for the ejector means to operate in when removing a record from said record receiving means.

2. A phonograph record player having a frame providing stationary magazine members on which a plurality of records are adapted to be supported in near vertical position a cyclically movable record transfer element disposed adjacent the magazine, the records being adapted to be moved by gravity toward said cyclically rotatable record transfer element adapted to retain the records normally in engagement with the magazine members, said element also having a pair of record transfer surfaces in connection therewith to which the support of the record nearest the record removal element is adapted to be transferred from said magazine members when the record transfer element is moved through one portion of a cycle of motion, a movable ejector member in association with either end of said transfer element, means including a cyclically-operated cam coupled to said transfer element to rock said element through a cycle of motion, means in connection with the ejector members adapted to confine the movement of said ejector members to a predetermined course with respect to the axis of said record transfer element, said ejector members being adapted to remove a record from the record transfer surfaces when said surfaces are carried to the ends of said ejector members as said record transfer element is moved through another portion of its cycle of motion, and means in connection with the ends of said ejectors to resist displacement, for a short interval, of the record from said ejector after said record has been removed from the transfer surfaces.

3. A phonograph record player having a frame providing stationary magazine members including a base member on which a plurality of records are adapted to be supported in near-vertical position, the records being adapted to be moved by gravity thereover, a record transfer element adjacent said base member adapted to be rocked through a cycle of motion, the element being adapted to retain the records normally in the magazine, record receiving means in connection with said element to which the record nearest the record transfer element is to be transferred from the magazine members when the record transfer element is rocked through a cycle of motion, a pair of ejector bars having slots therein, a pintle at either end of said record transfer element extending through the slots, means in fixed relationship to the frame and the ejector bars to provide a predetermined course for said bars, and cyclically operated drive means coupled to said record transfer means to operate said ejector bars for removing the record from said record receiving means when said record transfer means carries said record receiving means to the ends of said ejector bars.

4. A phonograph record player having a frame providing stationary magazine members including a base member on which a plurality of records are adapted to be supported in near vertical position, the records being adapted to be moved by gravity thereover, a record transfer cylinder adjacent said base member, follower means connected to said cylinder adapted to rock said cylinder through a cycle of motion, the cylinder being adapted to retain the records in the magazine, record receiving means in connection with said cylinder to which the record nearest the cylinder is to be transferred from the magazine members when said cylinder is rocked through a cycle of motion, a pair of ejector members having slots in each of said members, a pintle at either end of said cylinder extending through the slots about which said cylinder is rocked, crank means coupled to said ejector members, a shaft adapted to be rocked through a cycle of motion sequentially with respect to the motion of said transfer cylinder to operate said crank means, follower members on said crank means, means for governing the motion of both of said followers, and cyclically operated drive means coupled to said cam means to operate said ejector members and said cylinder for removing the record from said record receiving means when said cylinder carries said record receiving means to the ends of said ejector.

5. A phonograph record player comprising a magazine provided by stationary members, and a transfer member adapted to be moved in two directions of a cycle of motion, the transfer member being adapted to cooperate with the magazine members to retain a supply of records in near-vertical position, said transfer member being adapted to engage one of the records to separate it from the other records of the magazine, a pair of ejector members in association with said transfer member to remove the record therefrom and move it with the axis thereof in a fixed vertical plane, a horizontal turntable beside said magazine, an articulated spindle in fixed relationship to the axis of said turntable, said spindle having a free end portion extending into said vertical plane, the center hole of the record being adapted to be threaded over the spindle as it is moved by said ejector members, a record removal member adapted to be swung about an axis between the magazine and turntable to receive the record after it has been threaded over the spindle and to lower said record to the support of the turntable, said record removal members being adapted to remove the record from the turntable after it has been reproduced.

6. A phonograph record player comprising a magazine provided by stationary members including a laterally inclined base member, a rotary transfer member adapted to be rotated in two directions of a cycle of motion, the transfer member being adapted to cooperate with the base member to retain a supply of records in near-vertical position, said transfer member being adapted to engage the record nearest thereto to swing it away from the other records of the magazine, a pair of ejector members in association with said transfer member to remove the record from the transfer member after it has been swung away from the other records and move it with the axis thereof in a fixed vertical plane, a horizontal turntable beside said magazine, an articulated fixed spindle at the axis of said turntable, said spindle having a free end portion extending into said vertical plane, the center hole of the record thus being in position to be threaded over the spindle as it is moved by said ejector members, a record removal member adapted to be swung about an axis between the magazine and a level below the top of the turntable to support the record after it has been threaded over the spindle and to lower said record to the support of the turntable, said record removal members on swinging toward said magazine being adapted to remove the record from the turntable after it has been reproduced.

7. A phonograph record player comprising a frame, a prop member provided by said frame, a laterally inclined base member also provided by said frame, a record transfer cylinder at the lower edge of said base member to retain the records thereon while leaning away from the cylinder, said cylinder being adapted to be rotated in two directions in the course of a cycle of operation, said cylinder having a slot therein adapted to receive a record when said slot is carried below the lower edge of the base member as said cylinder is rotated in one direction, said slot being adapted to carry the record out of the magazine when said cylinder is rotated in the opposite direction, an ejector member slidably anchored on the axis of said cylinder for reciprocatory movement in a predetermined plane transversely of said axis, said ejector members being adapted on movement thereof to dislodge the record from the cylinder slot when said slot is carried to a plane in line with the ends of said ejector members, said ejectors being adapted to move the record so that its center hole is carried in a fixed vertical plane, a horizontal turntable beside the cylinder, a fixed spindle centrally of the turntable, a record engaging member pivoted to said spindle and swingable between two predetermined positions inclined with respect to the spindle axis, said record engaging member having a free end normally in position to engage the center hole of said record as said record is moved by said ejector members, and a record removal member pivoted on an axis between said cylinder and the turntable and adapted to be swung from a position adjacent the magazine to a point below the level of the top of the turntable to lower said record to the support of said turntable after it has been threaded over the spindle, said record removal member being adapted to lift the record from the turntable and move it out of engagement with the spindle as said swingable member is swung toward said magazine thereby enabling the record to drop to a point below the frame.

8. A phonograph record player comprising a magazine provided by stationary members, and a transfer member adapted to be moved in two directions during a cycle of motion, the transfer member being adapted to cooperate with the magazine members to retain a supply of records in near vertical position, said transfer member being movable to engage one of the records to separate it from the other records of the magazine, a pair of ejector fingers reciprocally movable in opposite directions in the course of a cycle of motion and in association with said transfer member to remove the record therefrom and move it with the axis thereof in a fixed vertical plane, a horizontal turntable beside said magazine, a spindle in fixed relationship to the axis of said turntable, said spindle having a free end portion extending into said vertical plane, the center hole of the record being adapted to be threaded over the spindle as it is moved by said ejector fingers, a record removal member between the magazine and turntable in swingable relation therewith to receive the record after it has been threaded over the spindle and to lower said record to the support of the turntable, said removal member engaging said record after it has been reproduced to remove said record from the turntable, and a frictional member being movably coupled to the record removal member to delay the release of said record from said removal member after said record is removed from said turntable.

9. A phonograph record player comprising a magazine provided by stationary members, and a transfer member adapted to be moved in two directions in a cycle of motion, the transfer member being adapted to cooperate with the magazine members to retain a supply of records in near vertical position, said transfer member being movable to engage one of the records to separate it from the other records of the magazine, a pair of ejector fingers reciprocally movable in opposite directions in the course of a cycle of motion and in association with said transfer member to remove the record therefrom and move it with the axis thereof in a fixed vertical plane, a horizontal turntable beside said magazine, a spindle in fixed relationship to the axis of said turntable, said spindle having a free end portion extending into said vertical plane, the center hole of the record being adapted to be threaded over the spindle as it is moved by said ejector fingers, a record removal member between the magazine and turntable in swingable relation therewith to receive the record after it has been threaded over the spindle and to lower said record to the support of the turntable, said removal member engaging said record after it has been reproduced to remove said record from the turntable, and a pair of fingers pivotally carried by the removal member having the frictional portions thereon engagable with said record to delay the release of said record from said removal member after it is removed from said turntable, and resilient means on said removal member to bias said fingers in a predetermined direction whereby said fingers offer no resistance to reception of a record by said removal member from said transfer member.

10. A phonograph record player comprising a magazine provided by stationary members, and a transfer member adapted to be moved in two directions of a cycle of motion, the transfer member being adapted to cooperate with the magazine members to retain a supply of records in near-vertical position, said transfer member being adapted to engage one of the records to separate it from the other records of the magazine, a pair of ejector members in association with said transfer member to remove the record therefrom and move it with the axis thereof in a fixed vertical plane, a horizontal turntable beside said magazine, a spindle in fixed relationship to the axis of said turntable, said spindle having a fixed base portion in extension axially of the turntable, a swingable portion pivoted at one end to said base portion, stop means in connection with one of said portions to limit the swing of said swingable portion, said swingable portion being movable between two predetermined positions in inclined relationship to said base portion, said swingable portion being formed to engage and enter into the center hole of said record as it is moved by said ejector members, a record removal member adapted to be swung about an axis between the magazine and turntable to receive the record after it has been threaded over the spindle and to lower said record to the support of the turntable, said record removal member being adapted to remove the record from the turntable after it has been reproduced.

11. A phonograph record player comprising a magazine provided by stationary members, and a transfer member adapted to be moved in two directions of a cycle of motion, the transfer member being adapted to cooperate with the magazine members to retain a supply of records in near-vertical position, said transfer member being adapted to engage one of the records to separate it from the other records of the magazine, a pair of ejector members in association with said transfer member to remove the record therefrom and move it with the axis thereof in a fixed vertical plane, a horizontal turntable beside said magazine, a spindle in fixed relationship to the axis of said turntable, said spindle having a vertical base portion supported centrally of the turntable, a swingable portion, arms on the end of one of said portions, the end of the other portion extending between said arms, a pin passing through the arms of one of said portions and the end of the other portion to pivotally associate the swingable portion with the base portion, a first stop surface on one of the portions between the arms thereof to limit the extent to which said swingable portion is adapted to be swung in one direction, a second stop surface between said arms to limit the extent to which said swingable portion is adapted to be swung in the opposite direction, said stop surfaces being adapted to limit movement of said swingable portion between two positions inclined with respect to said base portion, said swingable portion being formed to engage and enter into the center hole of said record as it is moved by said ejector members, a record removal member adapted to be swung about an axis between the magazine and turntable to receive the record after it has been threaded over the spindle and to lower said record to the support of the turntable, said record removal member being adapted to remove the record from the turntable after it has been reproduced.

12. A phonograph record player having a frame providing a base member to support a group of records on their peripheral edges and a turntable and drive means therefor providing rotatable movement for said records, a prop member spaced in elevated relationship to the base member for the records to lean against while resting on said base member, a transfer cylinder movably coupled to said frame and movable between predetermined positions in association with said base member, said base member being inclined laterally downward to provide for displacement of the records thereover by gravity and into engagement with said cylinder, a slot in said cylinder defined by parallel walls being relatively spaced apart a distance slightly greater than the thickness of a record, said slot being positioned in cooperative proximity to said base member when said cylinder is rotated to one of its predetermined positions to receive the top record of said group, said cylinder being rotatable to a second predetermined position to move said record out of the magazine and toward said turntable, said slot being formed and of sufficient length to provide a base for engagement with the periphery of said record at spaced apart points to position said record in alignment with said turntable, and means coupled to said cylinder and driven by said drive means for cyclically rotating said cylinder.

13. A phonograph record player having a frame providing a base member to support a group of records on their peripheral edges and a turntable and drive means therefor providing rotatable movement for said records, a prop member spaced in elevated relationship to the base member for the records to lean against while resting on said base member, a transfer cylinder movably coupled to said frame and having a longitudinal length at least equal to its diameter and movable between predetermined positions in association with said base member, said base member being inclined laterally downward to provide for displacement of the records thereover by gravity and into engagement with said cylinder, a slot in said cylinder defined by spaced apart parallel walls, said cylinder being formed with a flat surface parallel to the longitudinal axis thereof and connected to one of said walls and the periphery of said cylinder providing one of said walls with a greater radial length with respect to the other wall, said slot being positioned in cooperative proximity to said base member when said cylinder is rotated to one of its predetermined positions to receive the top record of said group, said cylinder being rotatable to a second predetermined position to move said record out of the magazine and toward said turntable, means in said slot engaging the periphery of said record at spaced apart points to position said record in alignment with said turntable, and means coupled to said cylinder and driven by said drive means for cyclically rotating said cylinder.

14. A phonograph record player having a frame providing a base member to support a group of records of their peripheral edges and a turntable and drive means therefor providing rotatable movement for said records, a prop member spaced in elevated relationship to the base member for the records to lean against while resting on said base member, a transfer cylinder movably coupled to said frame and having a longitudinal length at least equal to its diameter and movable between predetermined positions in association with said base member, said base member being inclined laterally downward to provide for displacement of the records thereover by gravity and into engagement with said cylinder, a slot in said cylinder defined by parallel walls being relatively spaced apart a distance slightly greater than the thickness of a record, said cylinder being formed with a flat surface parallel to the longitudinal axis thereof and connected to one of said walls and the periphery of said cylinder providing one of said walls with greater radial length with respect to the other wall, said slot being positioned in cooperative proximity to said base member when said cylinder is rotated to one of its predetermined positions to receive the top record of said group, said cylinder being rotatable to a second predetermined position to move said record out of the magazine and toward said turntable, said slot being formed and of sufficient length to provide a base for engagement with the periphery of said record at spaced apart points to position said record in alignment with said turntable, and means coupled to said cylinder and driven by said drive means for cyclically rotating said cylinder.

References Cited in the file of this patent

UNITED STATES PATENTS

| | | |
|---|---|---|
| 1,474,776 | Hunt | Nov. 20, 1923 |
| 1,597,391 | Raney | Aug. 24, 1926 |
| 1,962,858 | Collison et al. | June 12, 1934 |
| 2,029,191 | Raney | Jan. 28, 1936 |
| 2,047,160 | Zeruneith | July 7, 1936 |
| 2,063,573 | Yeider | Dec. 8, 1936 |
| 2,238,612 | Tsuchiya | Apr. 15, 1941 |
| 2,330,293 | Knox | Sept. 28, 1943 |
| 2,343,992 | Morrison | Mar. 14, 1944 |
| 2,354,899 | Wilber | Aug. 1, 1944 |
| 2,390,862 | Alexandersson | Dec. 11, 1945 |
| 2,519,187 | Hokanson | Aug. 15, 1950 |
| 2,555,478 | Emde et al. | June 5, 1951 |
| 2,557,645 | Fox | June 19, 1951 |